(12) United States Patent
Butcher et al.

(10) Patent No.: US 10,990,562 B2
(45) Date of Patent: Apr. 27, 2021

(54) SYSTEM AND METHOD OF ASYMMETRIC SYSTEM DESCRIPTION FOR OPTIMIZED SCHEDULING

(71) Applicant: DELL PRODUCTS, LP, Round Rock, TX (US)

(72) Inventors: Andrew Butcher, Cedar Park, TX (US); Stuart Allen Berke, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 247 days.

(21) Appl. No.: 16/245,838

(22) Filed: Jan. 11, 2019

(65) Prior Publication Data
US 2020/0226093 A1    Jul. 16, 2020

(51) Int. Cl.
*G06F 15/173* (2006.01)
*G06F 9/50* (2006.01)
*G06F 13/18* (2006.01)
*H04L 12/24* (2006.01)
*G06F 13/42* (2006.01)

(52) U.S. Cl.
CPC ...... *G06F 15/17337* (2013.01); *G06F 9/5038* (2013.01); *G06F 13/18* (2013.01); *G06F 13/4221* (2013.01); *H04L 41/0896* (2013.01); *G06F 2213/0026* (2013.01)

(58) Field of Classification Search
None
See application file for complete search history.

(56) References Cited

U.S. PATENT DOCUMENTS

| | | | |
|---|---|---|---|
| 7,007,125 B2 | 2/2006 | Barker et al. | |
| 10,325,343 B1* | 6/2019 | Zhao | G06F 11/3006 |
| 2004/0268000 A1* | 12/2004 | Barker | H05K 3/222 |
| | | | 710/301 |
| 2007/0083728 A1 | 4/2007 | Nijhawan et al. | |
| 2015/0007187 A1 | 1/2015 | Shows | |
| 2016/0140039 A1* | 5/2016 | Sodani | G06F 12/023 |
| | | | 711/119 |
| 2020/0125411 A1* | 4/2020 | Goodman | G06F 9/5016 |

* cited by examiner

*Primary Examiner* — Fahmida Rahman
(74) *Attorney, Agent, or Firm* — Larson Newman, LLP

(57) ABSTRACT

An information handling system includes processors disposed in sockets, and interconnect links providing point-to-point links between the sockets. One of the processors determines an arrangement of the processors, memories and the interconnect links, and determines a value for each of the processors, each of the memories, and each of the interconnect links. The processor calculates interconnect link bandwidth values for each of the interconnect links based at least in part on the determined value and the arrangement of the processors, the memories and the interconnect links. The processor also populates an interconnect bandwidth table using the interconnect link bandwidth values.

17 Claims, 11 Drawing Sheets

|  | Group 310A | Group 310B | Group 310C | Group 310D |
|---|---|---|---|---|
| Group 310A | 100 | 100 | 30 | 30 |
| Group 310B | 100 | 100 | 40 | 40 |
| Group 310C | 50 | 50 | 100 | 100 |
| Group 310D | 60 | 60 | 100 | 100 |

|  | 240A | 240B | 240C | 240D | 240E | 240F | 240G | 240H |
|---|---|---|---|---|---|---|---|---|
| 240A | 100 | 100 | 100 | 100 | 40 | 40 | 40 | 40 |
| 240B | 100 | 100 | 100 | 100 | 40 | 40 | 40 | 40 |
| 240C | 100 | 100 | 100 | 100 | 50 | 50 | 50 | 50 |
| 240D | 100 | 100 | 100 | 100 | 50 | 50 | 50 | 50 |
| 240E | 60 | 60 | 60 | 60 | 100 | 100 | 100 | 100 |
| 240F | 60 | 60 | 60 | 60 | 100 | 100 | 100 | 100 |
| 240G | 70 | 70 | 70 | 70 | 100 | 100 | 100 | 100 |
| 240H | 70 | 70 | 70 | 70 | 100 | 100 | 100 | 100 |

| | Group 310A | Group 310B | Group 310C | Group 310D |
|---|---|---|---|---|
| Group 310A | 100 | 100 | 30 | 30 |
| Group 310B | 100 | 100 | 40 | 40 |
| Group 310C | 50 | 50 | 100 | 100 |
| Group 310D | 10 | 10 | 100 | 100 |

|        | Core 840A | Core 840A | Core 840A | Core 840D | Core 840E | Core 840F | Core 840G | Core 840H | Core 840I | Core 840J | Core 840K | Core 840L | Core 840M | Core 840N | Core 840O | Core 840P |
|---|---|---|---|---|---|---|---|---|---|---|---|---|---|---|---|---|
| Core 840A | 100 | 100 | 100 | 100 | 100 | 100 | 100 | 100 | 22 | 22 | 22 | 22 | 22 | 22 | 22 | 22 |
| Core 840B | 100 | 100 | 100 | 100 | 100 | 100 | 100 | 100 | 22 | 22 | 22 | 22 | 22 | 22 | 22 | 22 |
| Core 840C | 100 | 100 | 100 | 100 | 100 | 100 | 100 | 100 | 25 | 25 | 25 | 25 | 25 | 25 | 25 | 25 |
| Core 840D | 100 | 100 | 100 | 100 | 100 | 100 | 100 | 100 | 25 | 25 | 25 | 25 | 25 | 25 | 25 | 25 |
| Core 840E | 100 | 100 | 100 | 100 | 100 | 100 | 100 | 100 | 25 | 25 | 25 | 25 | 25 | 25 | 25 | 25 |
| Core 840F | 100 | 100 | 100 | 100 | 100 | 100 | 100 | 100 | 28 | 28 | 28 | 28 | 28 | 28 | 28 | 28 |
| Core 840G | 100 | 100 | 100 | 100 | 100 | 100 | 100 | 100 | 28 | 28 | 28 | 28 | 28 | 28 | 28 | 28 |
| Core 840H | 100 | 100 | 100 | 100 | 100 | 100 | 100 | 100 | 28 | 28 | 28 | 28 | 28 | 28 | 28 | 28 |
| Core 840I | 20 | 20 | 20 | 20 | 20 | 20 | 20 | 20 | 100 | 100 | 100 | 100 | 100 | 100 | 100 | 100 |
| Core 840J | 20 | 20 | 20 | 20 | 20 | 20 | 20 | 20 | 100 | 100 | 100 | 100 | 100 | 100 | 100 | 100 |
| Core 840K | 20 | 20 | 20 | 20 | 20 | 20 | 20 | 20 | 100 | 100 | 100 | 100 | 100 | 100 | 100 | 100 |
| Core 840L | 28 | 28 | 28 | 28 | 28 | 28 | 28 | 28 | 100 | 100 | 100 | 100 | 100 | 100 | 100 | 100 |
| Core 840M | 28 | 28 | 28 | 28 | 28 | 28 | 28 | 28 | 100 | 100 | 100 | 100 | 100 | 100 | 100 | 100 |
| Core 840N | 28 | 28 | 28 | 28 | 28 | 28 | 28 | 28 | 100 | 100 | 100 | 100 | 100 | 100 | 100 | 100 |
| Core 840O | 28 | 28 | 28 | 28 | 28 | 28 | 28 | 28 | 100 | 100 | 100 | 100 | 100 | 100 | 100 | 100 |
| Core 840P | 28 | 28 | 28 | 28 | 28 | 28 | 28 | 28 | 100 | 100 | 100 | 100 | 100 | 100 | 100 | 100 |

*FIG. 10*

| | Group 1200A | Group 1200B | Group 1200C | Group 1200D |
|---|---|---|---|---|
| Group 1200A | 100 | 33 | 33 | 25 |
| Group 1200B | 22 | 100 | 18 | 22 |
| Group 1200C | 25 | 22 | 100 | 25 |
| Group 1200D | 28 | 40 | 40 | 100 |

1300

SYSTEM AND METHOD OF ASYMMETRIC SYSTEM DESCRIPTION FOR OPTIMIZED SCHEDULING

FIELD OF THE DISCLOSURE

The present disclosure generally relates to information handling systems, and more particularly relates to asymmetric system description for optimal scheduling in an information handling system.

BACKGROUND

As the value and use of information continue to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include processors disposed in sockets, and interconnect links providing point-to-point links between the sockets. One of the processors may determine an arrangement of the processors, memories and the interconnect links, and determine a value for each of the processors, each of the memories, and each of the interconnect links. The processor calculates interconnect link bandwidth values for each of the interconnect links based at least in part on the determined value and the arrangement of the processors, the memories and the interconnect links. The processor also populates an interconnect bandwidth table using the interconnect link bandwidth values.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 10 is an IBT according to at least one embodiment of the present disclosure;

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
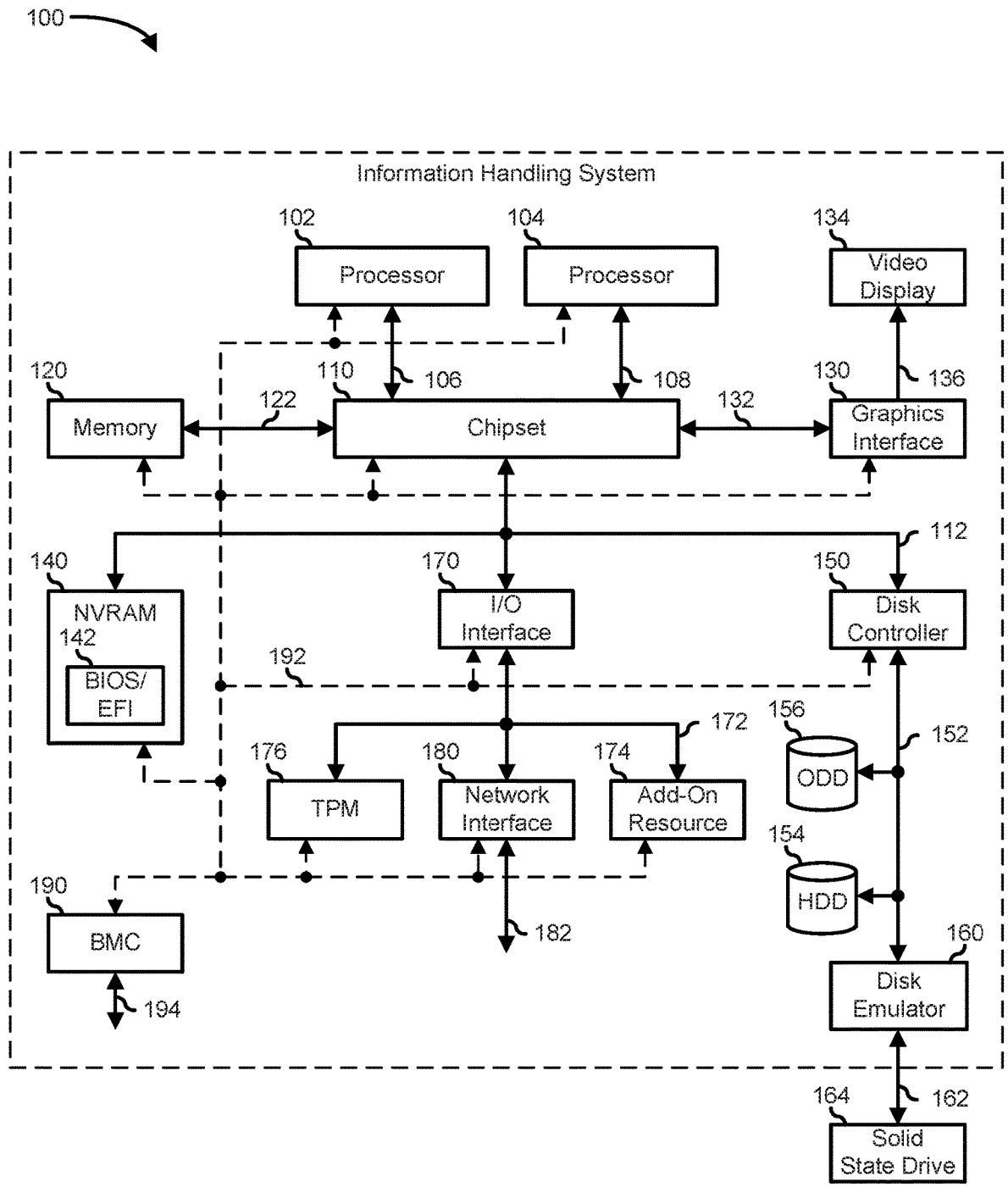
FIG. 1 is a block diagram of a general information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid state drive (SSD) 164, an input/output (I/O) interface 170 connected to an add-on resource 174 and a trusted platform module (TPM 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manages the data flows between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132, and provides a video display output 136 to a video display 134. An example of a graphics interface 132 includes a Peripheral Component Interconnect-Express (PCIe) interface and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface device 180 includes a network channel 182 that provides an interface to devices that are external to information handling system 100. In a particular embodiment, network channel 182 is of a different type than peripheral channel 172 and network interface 180 translates information from a format suitable to the peripheral channel to a format suitable to external devices. In a particular embodiment, network interface 180 includes a network interface card (NIC) or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term baseboard management controller (BMC) is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 180 can vary considerably based on the type of information handling system. BMC 190 can operate in accordance with an Intelligent Platform Management Interface (IPMI). Examples of BMC 190 include an Integrated Dell Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code. BMC 190 operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) GUI associated with BMC 190, an interface defined by the Distributed Management Taskforce (DMTF) (such as a Web Services Management (WS-MAN) interface, a Management Component Transport Protocol (MCTP) or, a Redfish interface), various vendor defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100, or is integrated onto another element of the information handling system such as chipset 110, or another suitable element, as needed or desired. As such, BMC 190 can be part of an integrated circuit or a chip set within information handling system 100. An example of BMC 190 includes an integrated Dell remote access controller (iDRAC), or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

The information handling system 100 may be designed with one or more physical processors that are mounted on separate sockets of a printed circuit board. As used herein, processors include cores or other devices that generate and receive memory transactions. Each physical processor is an integrated circuit or a single computing component integrated with one or multiple independent processor cores. The processor cores can read and execute multiple program instructions or software code at the same time, thus increasing overall processing speed for program instructions. The program instructions may use threads to allow parallel execution of an application code. An operating system responds to a request to create threads by allocating resources for the threads and enabling execution of the threads across available processor cores.

While the operating system may allocate threads for execution across multiple processor cores, the operating system does not distinguish between different individual processors that are mounted to separate sockets. The operating system may treat all of the available processors as one contiguous bank of processors. In addition, the operating system may also not consider access times associated with traversing inter-socket links of a processor core in a first socket to read or write memory attached to a second processor core at a second socket. As a result, one processor core may be operating at 100% utilization while another processor core is idle while there are runnable threads waiting in queues. The inter-socket links may also be referred to as interconnect links, a system bus or point-to-point links.

Figure 2:
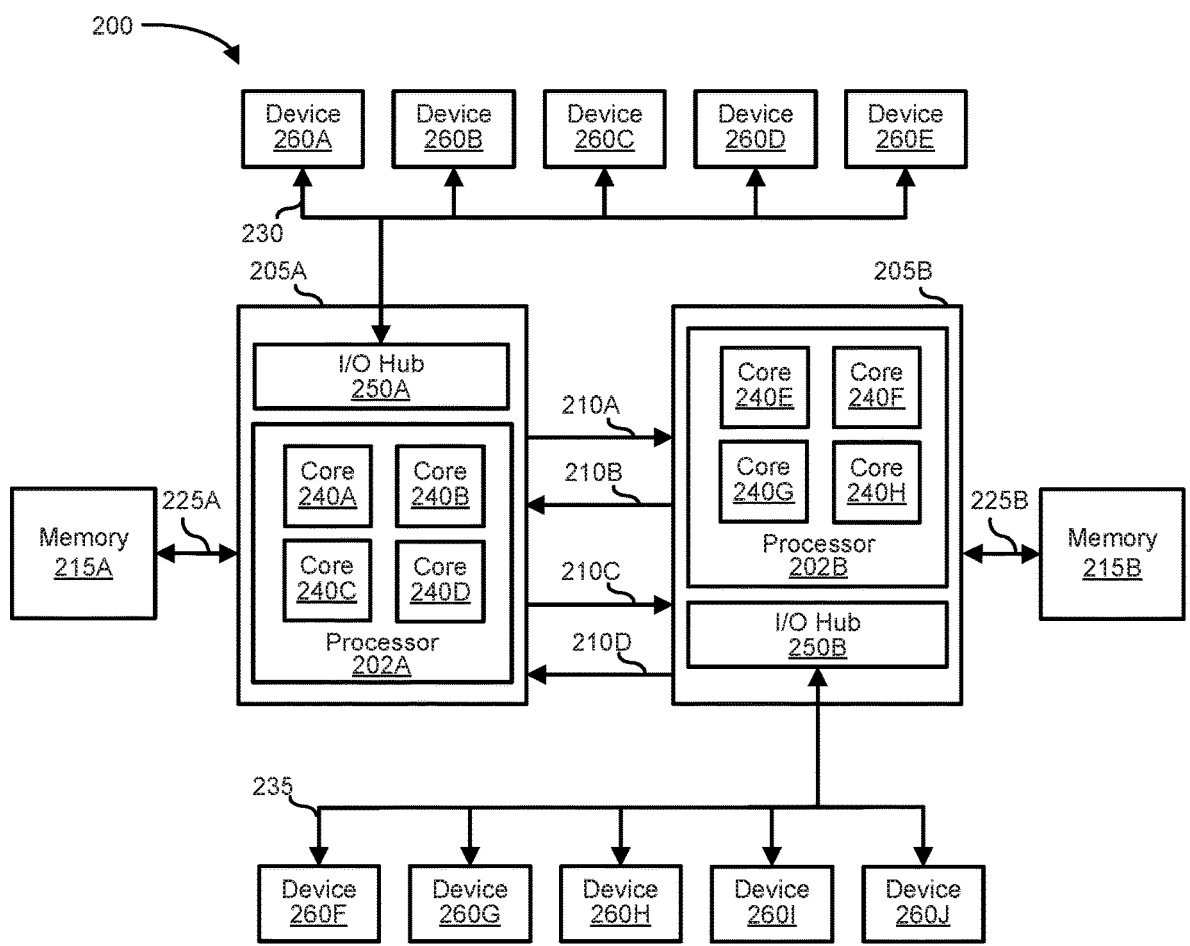
FIG. 2 is a more detailed illustration of the information handling system according to at least one embodiment of the present disclosure.

FIG. 2 shows an asymmetric information handling system 200 similar to information handling system 100. Information handling system 200 is an example of a multi-socket, asymmetric multi-processor system having multiple processor cores. Information handling system 200 includes sockets 205A and 205B. Socket 205A includes an I/O hub 250A and a processor 202A. Socket 205B includes an I/O hub 250B and a processor 202B. Processor 202A includes processor cores 240A-D. Processor 202B includes processor cores 240E-H. Processor 202A is coupled to a memory 215A via memory channel 225A. Processor 202B is coupled to a memory 215B via memory channel 225B. Socket 205A and socket 205B are connected by interconnect links 210A-D via interconnect ports (not shown). Interconnect links 210A-D may be uni-directional or bi-directional high-bandwidth interconnect links. I/O hub 250A is coupled to devices 260A-E via an I/O channel 230. I/O hub 250B is coupled to devices 260F-J via an I/O channel 235.

Interconnect links provide point-to-point links between the processors such as processors 202A and 202B. The processors may be connected to other processors by one or more dedicated high-speed interconnect links moving data between processor cores, a memory, and I/O controllers. The interconnect links connecting the processors may be uni-directional or bi-directional high bandwidth low-latency point-to-point links. An interconnect link may include two multiple lanes point-to-point data links, one in each direction, with a separate clock pair in each direction. The interconnect links may move data in parallel across multiple lanes and packets that are broken into multiple parallel transfers. The interconnect links may use low voltage differential swing signaling on data and command signals to achieve high data transfer rates. For example, the data transfer rate may be 12.8 GB/s in each lane. Examples of interconnect links include Intel® UltraPath®, Intel QuickPath®, HyperTransport® (HT), and AMD® inter-chip global memory interconnect (xGMI).

The hardware components, resources, and/or devices in the information handling system may be divided into groups. Processes or tasks may be distributed to a group or set of the hardware components, resources and/or devices. The hardware components, resources, and/or devices assigned to a group may include a set of processors, a set of memories, a set of interconnect links, a set of drives (such as an HDD drive, an SSD drive, an non-volatile memory express (NVMe) drive etc.), a set of interfaces (such as a PCIe interface), etc. In some groups, the hardware components, resources, and/or devices may be redundant and may include accelerators, graphics processing units (GPUs), field programmable gate arrays (FPGAs), I/O controllers, direct memory access (DMA) controllers, or anything else that can generate or receive memory data.

Each of these groups may be associated with an interconnect link that defines a pathway for a process and/or data flow to another group. The operating system may maintain processor affinity. As used herein, processor affinity is wherein packets associated with the process flow is processed only by a designated processor, processor core, node or group and flows only through a designated interconnect link associated with the processor, processor core, node or group. Processor affinity may also include directing a task and/or process to a specific or fixed path to the processor, the processor core, the node, or the group via a specific interconnect link(s).

Information handling system 200 may be characterized as having asymmetric memory access due to having two-tiered memory latency. A first tier of latency represents the latency that occurs when a processor accesses its own local system memory. A second tier of latency represents the latency that occurs when a processor accesses a "remote" system memory. The second tier of latency is higher because of the additional traversal of the interconnect link to access the remote system memory. Because the second tier of latency is higher, more weight may be given to the remote system memory.

Figures 3, 4, 5:
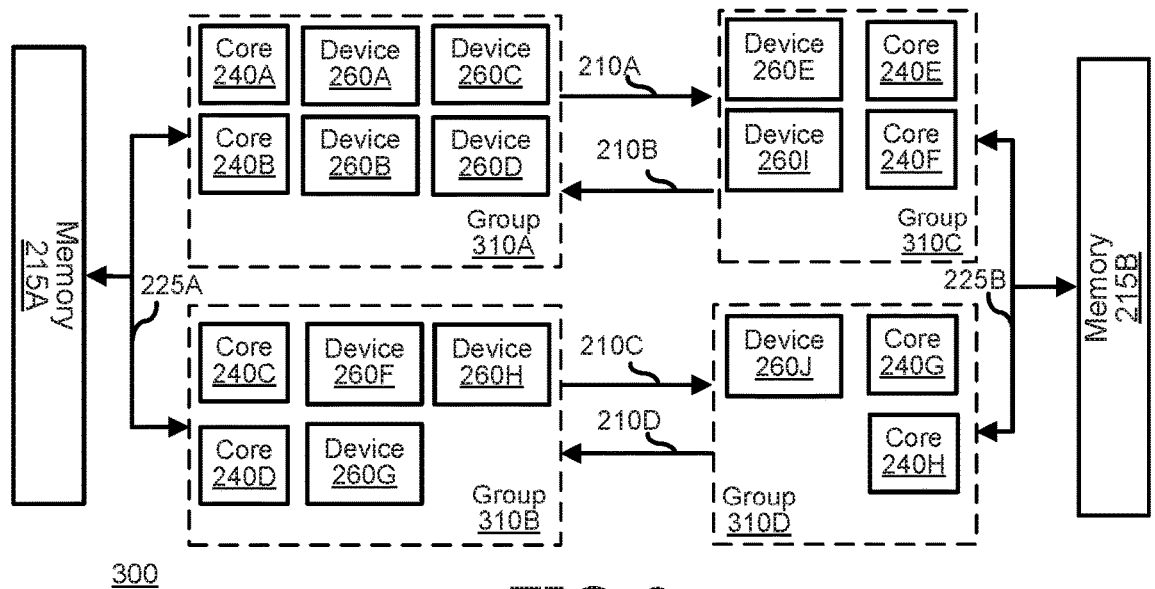
FIG. 3 is a block diagram of a system topology of an information handling system according to an embodiment of the present disclosure.
FIG. 4 is an interconnect bandwidth table (IBT) according to at least one embodiment of the present disclosure.
FIG. 5 is an IBT according to at least one embodiment of the present disclosure.

FIG. 3 shows a system topology 300 showing distribution of certain resources into groups and association with other groups. Group 310A includes processor cores 240A-B, devices 260A-D. Group 310A is connected with group 310C via interconnect link 210A. Group 310C includes processor cores 240E-F and devices 260E and 260I. Group 310C is connected to group 310A via interconnect link 210B. Group 310B includes processor cores 240C-D and devices 260F-H. Group 310B is connected to group 310D via interconnect link 210C. Group 310D includes processor cores 240G-H and device 260J. Group 310D is connected to group 310B via interconnect link 210D. The interconnect links between groups may be configured differently as desired.

The system topology as shown in FIG. 3, which may also be referred to as an arrangement of the hardware component and resources, may have been configured during initialization or at runtime. During initialization, the BIOS/EFI determines configuration information. During runtime, the operating system determines the configuration information. The BIOS/EFI may store the topology information in a non-volatile memory. The topology information may include data regarding location, identity, and bandwidth of the components or resources. The topology information may also include settings and/or setting changes from an administrator. The topology information may further include a processor or stock keeping unit (SKU) or part number and system scheduling policy.

A SKU refers to an expected operational configuration for a particular information handling system. The SKU may embody information such as manufacturer, product description, BIOS, firmware, configuration, information on associated devices that may distinguish the information handling system from other information handling systems. The SKU can also refer to a unique identifier. The topology information may be defined in one or more files. Each file may be associated with a specific topology layer. Other variations and combinations of representing topology information are contemplated with embodiments described herein.

Advanced Configuration and Power Interface (ACPI) provides information regarding hardware configuration and allows operating systems to perform power management of devices. ACPI data are hierarchically organized in description tables built by a computer firmware. The ACPI specification allows for tables that describe the architecture of the information handling system so that the operating system may allocate resources more efficiently. These tables include entries that describe the affinity between a microprocessor and the various memory units in the system.

A static resource affinity table (SRAT) can store processor-memory affinities for a particular information handling system. The SRAT, as defined in the ACPI specification, however, does not have the capability to define multi-level memory and multi-processor dependencies for multi-processor systems, such as non-uniform memory access (NUMA) based systems. While this problem can be solved by adding a system locality information table (SLIT) defined in the ACPI specification, the population of a SLIT depends on the relative distance between the memory unit and the processor also referred to as a system locality or proximity domain. Thus, the SLIT values fail into account other variables that can affect memory access times, such as the available bandwidth of the interconnect links that connect the memory units and microprocessors. In addition, a number of different devices with various attributes may share the interconnect links. Further, the number of devices that share one interconnect link may be different than the number of devices that share another interconnect link. Thus, the available bandwidth of some interconnect links may be more limited for some than others.

The NUMA platform is a multi-processor system where the processing elements share a single global memory that is physically distributed into several memory banks. These memory banks are interconnected by a specialized network. Due to this interconnection, memory access costs may vary depending on the distance (latency) between processing elements accessing the same memory bank (bandwidth). Since these platforms are becoming ubiquitous in high-performance computing it is important to reduce the access latency and to increase the available bandwidth for data access on them. Thus, optimization of current scheduling algorithms to incorporate the optimal allocation of available bandwidths on the interconnect links may significantly enhance performance.

A table also referred to as an IBT provides a matrix that describes the relative available bandwidth of interconnect links between all possible pairings of system localities in the asymmetric information handling system. The IBT may be used to optimize the current scheduling algorithms. The IBT may also be used for effective resource management of the various resources or hardware components of the information handling system. As used herein, a system locality may also be referred to as a group, a node or a set. The system localities used herein is not limited to the definition of system localities as used in the SLIT. For example, the system localities used in the IBT may be the same or different from the system localities used in the SLIT. The system localities in the IBT may be grouped differently than the system localities used in the SLIT. Further, elements of the system localities used in the IBT, such as a set of processors, processor cores, interconnect links, devices, etc., may be different from the elements used in the system localities of the SLIT.

FIG. 4 shows an IBT 400 based on information handling system 200 of FIG. 2 and system topology 300 of FIG. 3. In a particular embodiment, IBT 400 lists each system locality in successive rows and columns. IBT 400 is a simple matrix providing values depicting bandwidth values of interconnect link that connects one group to another. In this embodiment, the bandwidth values reflect the available spare bandwidth of an interconnect link from one group to another. The value of each entry[i,j] in the IBT 400, where i represents a row of the matrix and j represents a column of the matrix, indicates the available spare bandwidth of the interconnect links from a system locality i to every other system locality j in the information handling system. In this embodiment, the system locality is a group as shown in system topology 300 of FIG. 3. The entry value is a spare bandwidth available of the interconnect link. The entry value is a one-byte unsigned integer which is equivalent to the (max link bandwidth)−(((projected use per device)*(number of devices))+bandwidth allocated for the memory and processor core).

A reference value is set to 100, which is a maximum spare bandwidth available of the interconnect link without any usage allocation. A process flow from a group to itself is normalized to the reference value. The process flow from a group to another group in the same processor is also normalized to the reference value. In this embodiment, the process flows from one group to another group uses the same interconnect link which may also be referred to as using a fixed path.

In this embodiment, process flow from group 310A to group 310C uses interconnect link 210A. Assuming devices 260A-D, processor cores 240A-B, and memory 215A is assigned 10 units of bandwidth each for a total of 70 units of bandwidth is allocated to interconnect link 210A Hence, an upper bound of 30 units of bandwidth is available for interconnect link 210A.

Process flow from group 310B to group 310D uses interconnect link 210C. Assuming devices 260F-H, processor cores 240C-D, and memory 215A is assigned 10 units of bandwidth each for a total of 60 units of bandwidth is allocated to interconnect link 210C. Hence, an upper bound of 40 units of bandwidth is available at interconnect link 210C.

Process flow from group 310C to group 310A uses interconnect link 210B. Assuming devices 260E and 260I, processor cores 240E-F, and memory 215B are assigned 10 units of bandwidth each for a total of 50 units of bandwidth is allocated to interconnect link 210C. Hence, an upper bound of 50 units of bandwidth is available at interconnect link 210B.

Process flow from group 310D to group 310B uses interconnect link 210D. Assuming device 260J is assigned a weight of 10 units of bandwidth, processor cores 240G-H is assigned 10 units of bandwidth each, and memory 215B is assigned 10 units of bandwidth, for a total of 40 units of bandwidth is allocated to interconnect link 210D. Hence, an upper bound of 60 units of bandwidth is available at interconnect link 210D.

Because the available bandwidth capacity of the interconnect links is limited, an effective method of allocating the bandwidth is needed. In one embodiment, the sum of the bandwidth of resources carried on an interconnect link may not exceed the available bandwidth capacity of that interconnect link. Thus, each interconnect link has an upper-bound or maximum bandwidth available for scheduling. The objective is to allocate the available bandwidth on each interconnect link optimally among the processes that may be using the resources of the information handling system to avoid saturating the interconnect links. Consider an application process that requires 50 GB/s, the application process may be assigned to an interconnect link with an upper bound of no less than 50 GB/s. Here, an application process using information in IBT 400 may prioritize assignment of an application process to interconnect link 210D since interconnect link 210D has the highest maximum available bandwidth.

Although IBT 400 is shown in particular embodiment, those skilled in the art will readily appreciate that many modifications are possible. For example, calculation of the available bandwidth values may include bandwidth allocation for network interfaces such as a PCIe interface, an open core protocol (OCP) interface, etc. In yet another example, the calculation may reference affinity based on a set of processors, a set of processor cores, a set of nodes, etc. instead of groups.

FIG. 5 shows an IBT 500 based on information handling system 200 of FIG. 2 and system topology 300 of FIG. 3. In a particular embodiment, IBT 500 lists each processor core in successive rows and columns. As used in IBT 500, a processor core is a system locality. IBT 500 is a simple matrix providing the upper bound of bandwidth available of an interconnect link from one system locality to another. The value of each entry[i,j] in the IBT 500, where i represents a row of a matrix and j represents a column of a matrix, indicates the available spare bandwidth of the interconnect links from a system locality i to every other system locality j in the information handling system. The entry value is a one-byte unsigned integer. The available spare bandwidth of the interconnect links is equivalent to the (max link bandwidth)−(((projected use per device)*(number of devices))+bandwidth allocated for the memory and processor core).

A reference value is set to 100, which marks the maximum bandwidth available of the interconnect link without any usage allocation. The value 100 denotes that the interconnect link is not bandwidth limited. A process flow from a processor core to itself is normalized to 100. The process flow from a processor core to another processor core in the same processor is also normalized 100. In this embodiment, the process flows from one processor core to another processor core uses a specific interconnect link which may also be referred to as using a fixed path.

In this embodiment, the process flow from processor core 240A to processor core 240E or processor core 240F uses interconnect link 210A. Assuming devices 260A-D, processor core 240A, and memory 215A are each assigned 10 units bandwidth for a total of 60 units of bandwidth. Hence, an upper bound of 40 units of bandwidth is available for interconnect link 210A.

Process flow from processor core 240B to processor core 240E or processor core 240F uses interconnect link 210A. Assuming devices 260A-D, processor core 240B, and memory 215A are assigned 10 units bandwidth each for a total of 60 units of bandwidth. Hence, an upper bound of 40 units of bandwidth is available for interconnect link 210A.

Process flow from processor core 240C to processor core 240G or processor core 240H uses interconnect link 210C. Assuming devices 260F-H, processor core 240C, and memory 215A are assigned 10 units bandwidth each for a total of 50 units of bandwidth. Hence, an upper bound of 50 units of bandwidth is available for interconnect link 210C.

Process flow from processor core 240D to processor core 240G or processor core 240H uses interconnect link 210C. Assuming devices 260F-H, processor core 240C, and memory 215A are assigned 10 units bandwidth each for a total of 50 units of bandwidth. Hence, an upper bound of 50 units of bandwidth is available for interconnect link 210C.

Process flow from processor core 240E to processor core 240A or processor core 240B uses interconnect link 210B. Assuming devices 260E and 260I, processor core 240F, and memory 215B are assigned a weight of 10 units of bandwidths each for a total of 40 units of bandwidth. Hence, an upper bound of 60 units of bandwidth is available at interconnect link 210B.

Process flow from processor core 240F to processor core 240A or processor core 240B uses interconnect link 210B. Assuming devices 260E and 260I, processor core 240F, and memory 215B are assigned a weight of 10 units of bandwidths each for a total of 40 units of bandwidth. Hence, an upper bound of 60 units of bandwidth is available at interconnect link 210B.

Process flow from processor core 240G to processor core 240C or processor core 240D uses interconnect link 210D. Assuming device 260J, processor core 240G, and memory 215B are assigned a weight of 10 units of bandwidths each for a total of 30 units of bandwidth. Hence, an upper bound of 70 units of bandwidth is available at interconnect link 210D.

Process flow from processor core 240H to processor core 240C or processor core 240D uses interconnect link 210D. Assuming device 260J, processor core 240G, and memory 215B are assigned a weight of 10 units of bandwidths each for a total of 30 units of bandwidth. Hence, an upper bound of 70 units of bandwidth is available at interconnect link 210D.

Figures 6, 7:
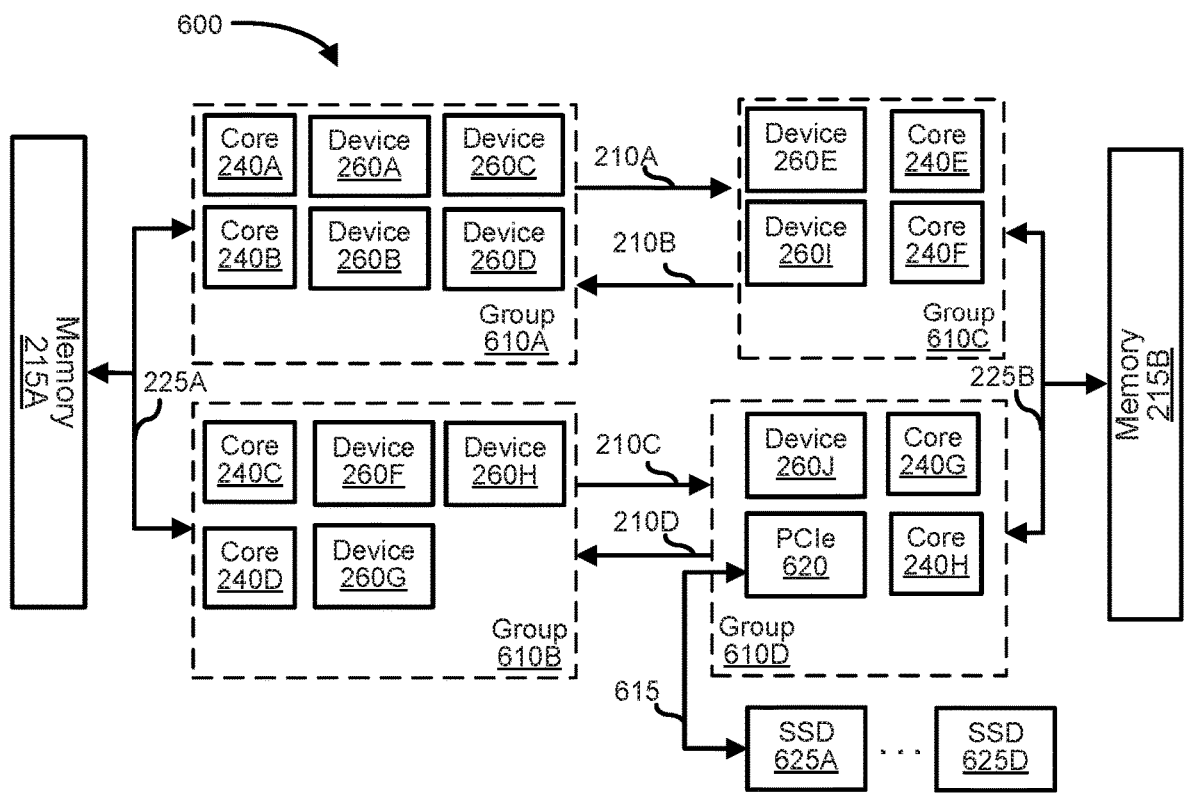
FIG. 6 is a block diagram of a system topology of an information handling system according to an embodiment of the present disclosure.
FIG. 7 is an IBT according to at least one embodiment of the present disclosure.

FIG. 6 shows a system topology 600 showing distribution of certain hardware components and resources into groups and association with other groups. Group 610A includes processor cores 240A-B, devices 260A-D. Group 610A is connected with group 610C via interconnect link 210A. Group 610C includes processor cores 240E-F and devices 260E and 260I. Group 610C is connected to group 610A via interconnect link 210B. Group 610B includes processor cores 240C-D and devices 260F-H. Group 610B is connected to group 610D via interconnect link 210C. Group 610D includes processor cores 240G-H, device 260J, and PCIe 270. PCIe 270 is coupled to SSDs 275A-D via I/O channel 615. Group 610D is connected with group 610B via interconnect link 210D.

Similar to the groups in FIG. 3, the groups in FIG. 6 may have been configured during initialization or at runtime. For example, the PCIe 270 and SSDs 275-D may have been added at runtime. At that point, the operating system may receive an interrupt and updates the stored configuration information. The operating system may also update the IBT.

The example algorithm in FIG. 4 used in calculating interconnect bandwidth values that populated the IBT 400 may be different from the algorithm used in other embodiments. The algorithm may use more or fewer factors. For example, the algorithm may also include attributes not used in the current calculation such as a level of memory hierarchy between system nodes. The algorithm may also assign a different weight based on the effect of a hardware component to memory access. For example, if memory hierarchy counts affect access speed more than changes in memory size, the algorithm may assign a larger weight to the memory hierarchy than to the memory size. The assignment of weight may be determined by an administrator or dynamically by the algorithm.

FIG. 7 shows an IBT 700 based on the information handling system 200 of FIG. 2 and system topology 600 of FIG. 6. In a particular embodiment, IBT 700 lists each group in successive rows and columns. IBT 700 is a simple matrix providing the upper bound of bandwidth available of an interconnect link from one group to another. The value of each entry[i,j] in the IBT 700, where i represents a row of a matrix and j represents a column of a matrix, indicates the available spare bandwidth of the interconnect links from a system locality i to every other system locality j in the system. As used in IBT 700 system locality refers to the groups of FIG. 6. The entry value is a one-byte unsigned integer which is equivalent to the (max link bandwidth)−(((projected use per device)*(number of devices))+bandwidth allocated for the memory and processor core).

Similar to IBT 400, a reference value is set to 100, which marks the maximum bandwidth available of the interconnect link without any usage allocation. In this embodiment, process flow from group 610A to group 610C uses interconnect link 210A. Assuming devices 260A-D, processor cores 240A-B, and memory 215A is assigned 10 units of bandwidth each for a total of 70 units of bandwidth is allocated to interconnect link 210A Hence, an upper bound of 30 units of bandwidth is available for interconnect link 210A.

Process flow from group 610B to group 610D uses interconnect link 210C. Assuming devices 260F-H, processor cores 240C-D, and memory 215A is assigned 10 units of bandwidth each for a total of 60 units of bandwidth is allocated to interconnect link 210C. Hence, an upper bound of 40 units of bandwidth is available at interconnect link 210C.

Process flow from group 610C to group 610A uses interconnect link 210B. Assuming devices 260E and 260I, processor cores 240E-F, and memory 215B are assigned 10 units of bandwidth each for a total of 50 units of bandwidth is allocated to interconnect link 210C. Hence, an upper bound of 50 units of bandwidth is available at interconnect link 210B.

Process flow from group 610D to group 610B uses interconnect link 210D. Assuming device 260J, processor cores 240G-H, memory 215B, PCIe 620, and SSDs 625A-D is assigned 10 units of bandwidth each, for a total of 90 units of bandwidth is allocated to interconnect link 210D. Hence, an upper bound of 10 units of bandwidth is available at interconnect link 210D.

Although IBT 700 is shown in particular embodiment, those skilled in the art will readily appreciate that many modifications are possible. In one example, interconnect link 210D may be reassigned to connect PCIe 620 to SSDs 625A-I instead of using I/O channel 615. The reassignment reduces the four interconnect links used in connecting groups 610A-D from four interconnect links to three. Because interconnect link 210 has been reassigned group 310D may be reassigned to use interconnect link 210B. Because of the reassignments, entry values in the IBT 700 may be recalculated.

Figure 8:
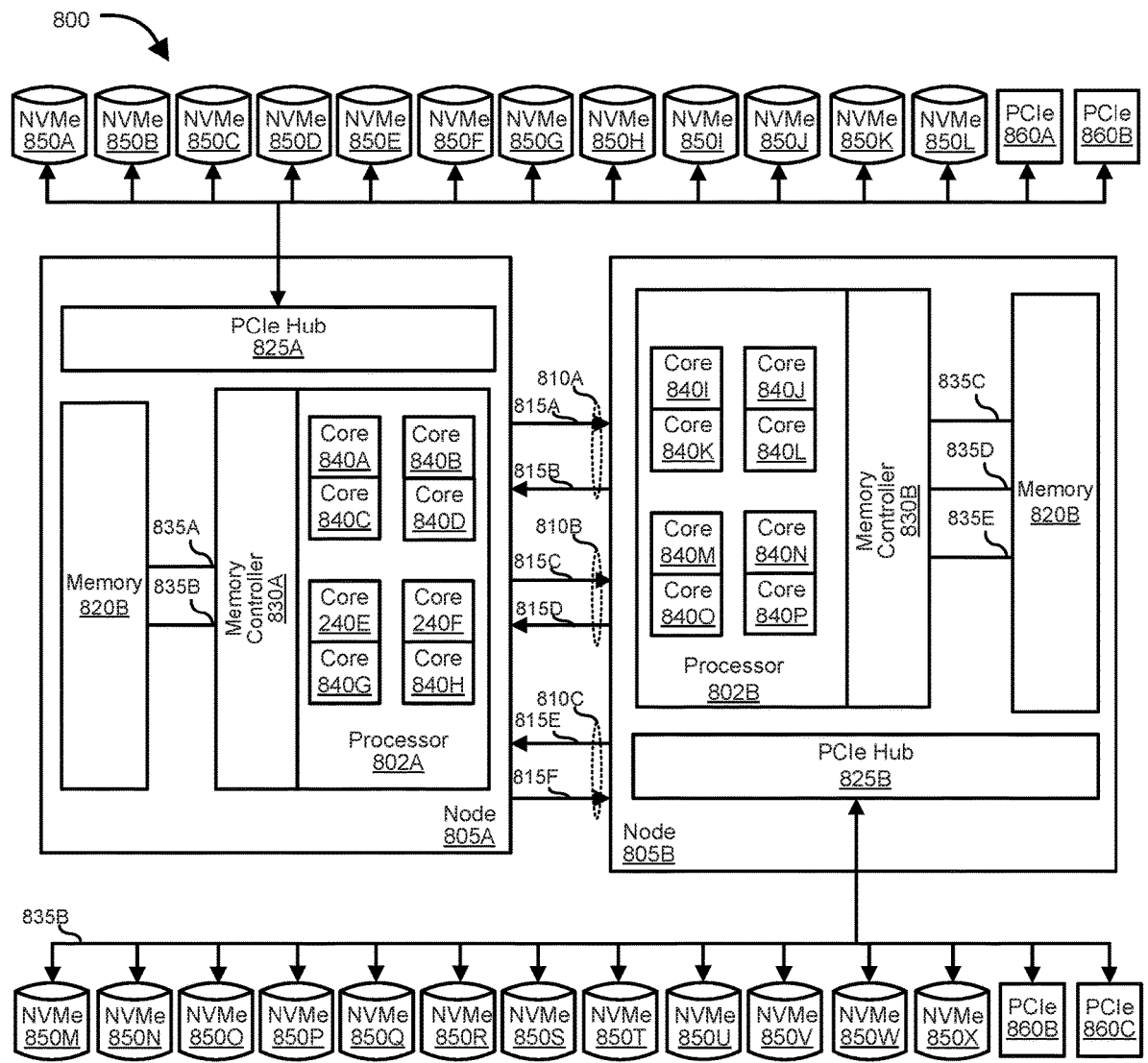
FIG. 8 is a block diagram of an information handling system according to at least one embodiment of the present disclosure.

FIG. 8 shows a diagram of an information handling system 800 similar to information handling system 100. Information handling system 800 is an example of a multi-socket, asymmetric multi-processor system having multiple processor cores. Multiprocessor computers with distributed shared memory are often organized into multiple nodes with one or more processors per node. These individual nodes usually contain a processor, memory, one or more input-output devices (I/O), and an interconnect link that connects all the nodes.

Information handling system 800 includes nodes 805A and 805B. Node 805A includes a PCIe hub 825A, a processor 802A, a memory controller 830A, and a memory 820A. Node 805B includes a PCIe hub 825B, a processor 802B, a memory controller 830B, and a memory 820B. Processor 802A includes processor cores 840A-H. Processor 802B includes processor cores 8401-P. Processor 802A is coupled with memory 820A via memory channels 835A-B. Processor 802B is coupled with memory 820B via memory channels 835C-E. node 805A may be connected to node 805B via interconnect link pairs 810A-C. Interconnect link pair 810A may include uni-directional high-bandwidth interconnect links 815A-B which may be coupled to nodes 805A and 805B via interconnect ports (not shown). Interconnect link pair 810B may include uni-directional high-bandwidth interconnect links 815C-D which may be coupled to nodes 805A and 805B via interconnect ports (not shown). Interconnect link pair 810C may include uni-directional high-bandwidth interconnect links 815E-F which may be coupled to nodes 805A and 805B via interconnect ports (not shown). In one embodiment, memory 820A and 820B have the same memory capacity and bandwidth. However, a person skilled in the art recognizes that the memory capacity and bandwidth of memory 820A may be different from the memory capacity and bandwidth of memory 820B.

NVMe drives 850A-L, OCP 865, and PCIe 860A may be coupled to PCIe hub 825A via an I/O channel 835A. NVMe drives 850M-X, PCIe 860B, and PCIe 860C may be coupled to PCIe hub 825B via an I/O channel 835B.

Processors 802A and 802B may include a set of link ports (not shown) to accommodate interconnect links 815A-F. Processors 802A and 802B may be constrained by pin count, die size and other considerations in the number of interconnect links it can support. If at least one of interconnect links 815A-F is used to connect to peripheral devices instead, the number of interconnect links connecting each of the processors to other processors is reduced. Because the number of interconnect links between processors 802A and 802B is reduced there is a likelihood that the remaining interconnect links may be saturated which may affect performance.

An efficient scheduling algorithm should be aware of the configuration information of the information handling system and processes that exist in the information handling system in order to keep performance as efficient as possible. The scheduling algorithm should also be aware of changes in the configuration information and process as these changes may affect performance. The scheduling algorithm may be performed by a software or firmware scheduler that assigns and/or re-assigns resources and/or execution of processes and/or threads based on optimal utilization of the interconnect links among others. The configuration information may be reflected in the IBT. The IBT as mentioned earlier may help the scheduler to determine the allocation of interconnect links by identifying an interconnect link with the maximum available bandwidth. By using the interconnect links with the maximum available bandwidth oversubscription of an interconnect link may be avoid improving performance.

Figure 9:
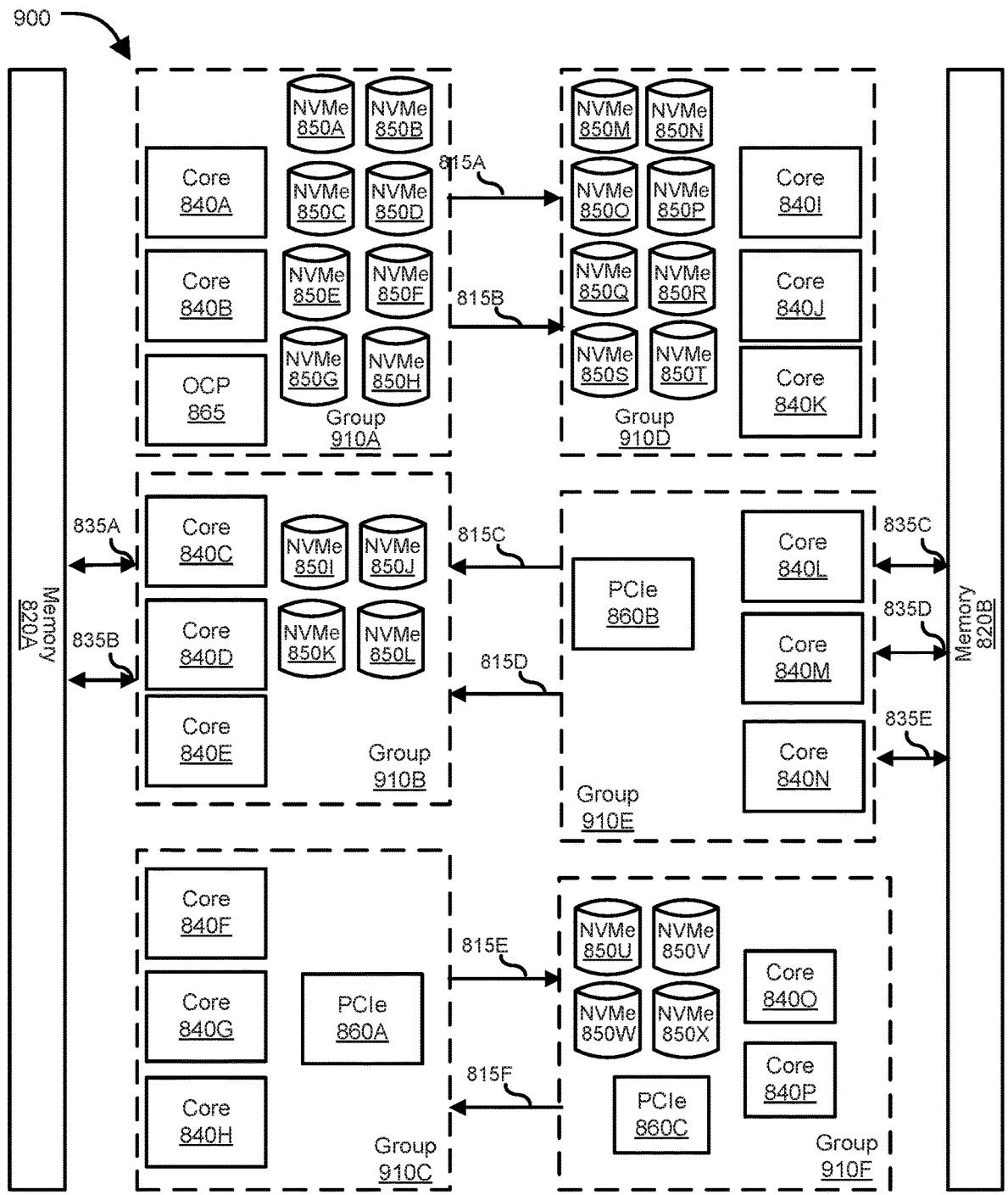
FIG. 9 is a block diagram of a system topology of an information handling system according to an embodiment of the present disclosure.

FIG. 9 shows a system topology 900 showing distribution of certain hardware components and resources into groups and its association with other groups. Group 910A includes processor cores 840A-B, NVMe drives 850A-H, and OCP 865. Group 910A is connected to group 910D via an interconnect link 815A. Group 910B includes processor cores 840C-E and NVMe drives 850I-L. Group 910B is connected to Group 910E via an interconnect link 815C. Group 910C includes processor cores 840F-H and PCIe 860A. Group 910C is connected to group 910E via an interconnect link 815E. Group 910D includes processor cores 8401-K and NVMe drives 850M-T. Group 910D is connected to group 910A via interconnect link 815B. Group 910E includes processor cores 840L-N and PCIe 860B. Group 910D is connected to group 910B via an interconnect link 815D. Group 910F includes processor cores 8400-P, NVMe drives 850U-X and PCIe 860C. Group 910F is connected to group 910C via an interconnect link 815F. Groups 910A-C are coupled with memory 820A via memory channels 835A-B. Groups 910D-C are coupled with memory 820B via memory channels 835C-E.

The groups as shown in FIG. 9 may have been configured during initialization or at runtime and configuration information may be determined by the BIOS/EFI at those times. The BIOS/EFI may be used to ensure that all components are functional. Particularly, the BIOS may be responsible for establishing the association between device components (like disk drives, video controllers, keyboard, mouse, etc.) and the operating system executed by the information handling system. The BIOS/EFI may also include data and instructions that enable the operating system to access the information handling system hardware. The BIOS/EFI is stored in the information handling system's memory, typically in non-volatile memory such as flash memory, for example. The BIOS/EFI configuration data may include power data and/or performance data for one or more system components, interconnect links, I/O devices, interfaces, and/or one or more network-accessible components. The configuration data may also include settings and/or setting changes. The configuration data may further include other information such as processor part number or the SKU. The configuration data may also include information regarding resource allocation designating which resources are allocated to which interconnect link, the definition of groups, NUMA configuration, and scheduling optimization.

The configuration information may be used to determine which components or groups that subscribed to a particular interconnect link. Current systems may use the SRAT and the SLIT during scheduling but do not take into account the bandwidth available of the interconnect links. Optimization of current scheduling algorithms to incorporate the optimal allocation of bandwidths on the interconnect links may significantly enhance performance metrics such as latency and throughput.

Using the architecture of the information handling system, the BIOS/EFI generates the IBT. The rows and columns are system localities similar to the SLIT. The table entries are relative worst-case bandwidth capacity of the interconnect links which will allow the operating system to place priority on different system resources such as, processor cores, storage drives or network ports. Similar to the operating system using the SRAT and the SLIT, once the IBT is populated, the operating system may assign tasks according to the calculated available maximum or upper bound bandwidth capabilities in the IBT. By doing so, the interconnect links with the highest available maximum bandwidth may be utilized first in order to avoid saturating the interconnect links with less available maximum bandwidth.

FIG. 10 shows an IBT 1000 based on the information handling system 800 of FIG. 8 and system topology 900 of FIG. 9. In a particular embodiment, IBT 1000 lists each group in successive rows and columns. IBT 1000 is a simple matrix providing the upper bound of bandwidth available of the interconnect links. The value of each entry[i,j] in the IBT 1000, where i represents a row of a matrix and j represents a column of a matrix, indicates the average bandwidth budget per device. The value of the entry is calculated using the formula (maximum interconnect link bandwidth)/(total maximum used bandwidth)="average bandwidth budget per device." The value of the entry is capped to a maximum value and normalized to whole numbers.

A reference value is set to 100, which marks the maximum bandwidth available of the interconnect link without any usage allocation. A process flow from a group to itself is normalized to 100. The process flow from a group to another group in the same processor is also normalized 100. In this embodiment, the process flows from one group to another group uses the same interconnect link which may also be referred to as using a fixed path.

Below are calculations of values used in IBT 1000:
a. Group 910A to Group 910D-F:
   i. Interconnect link 815A: 2 units of bandwidth capacity
      1. Interconnect link 815A with a bandwidth capacity of 21 GB/s. 10 GB/s is equivalent to 1 unit of bandwidth.
   ii. NVMe drives 850A-H: 4 units of bandwidth
      1. One NVMe drive with a bandwidth capacity of 3.2 GB/s. 6 GB/s bandwidth is equivalent to 1 unit of bandwidth.
   iii. Memory 820A: 4 units of bandwidth
      1. Memory 820A has a bandwidth of 20 GB/s. 10 GB/s is equivalent to 1 unit of bandwidth.
      2. 2 units of bandwidth per processor core
   iv. OCP 865: 1 unit of bandwidth
   v. (maximum interconnect link bandwidth)/(total max used bandwidth)="average bandwidth budget per device"
      1. 2 units of bandwidth capacity for Interconnect link 815A/(4 units of bandwidths for NVMe drives 850A-H+4 units of bandwidth for Memory channels 835A-B+1 unit of bandwidth for OCP 865)
      2. 2/(4+4+1)*100≈22 units of bandwidth
b. Group 910B to Group 910D-F:
   i. Interconnect link 815C: 2 units of bandwidth capacity
      1. Interconnect link 815C with a bandwidth capacity of 21 GB/s. 10 GB/s is equivalent to 1 unit of bandwidth.
   ii. NVMe drives 850I-L: 2 units of bandwidth
      1. One NVMe drive with a bandwidth capacity of 3.2 GB/s. 6 GB/s bandwidth is equivalent to 1 unit of bandwidth.
   iii. Memory 820A: 6 units of bandwidth
      1. Memory 820A has a bandwidth of 20 GB/s. 10 GB/s is equivalent to 1 unit of bandwidth.
      2. 2 units of bandwidth per processor core
   iv. (maximum interconnect link bandwidth)/(total max used bandwidth)="average bandwidth budget per device"
      1. 2 units of bandwidth capacity for Interconnect link 815C/(2 units of bandwidths for NVMe drives 850I-L+6 units of bandwidth for Memory channels 835A-B)
      2. 2/(2+6)*100≈25 units of bandwidth
c. Group 910C to Groups 910D-F:
   i. Interconnect link 815E: 2 units of bandwidth capacity
      1. Interconnect link 815E with a bandwidth capacity of 21 GB/s. 10 GB/s is equivalent to 1 unit of bandwidth.
   ii. PCIe 860A: 1 unit of bandwidth
      1. PCIe has 16 PCIe lanes with 16 GB/s. 16 GB/s is equivalent to 1 unit of bandwidth.
   iii. Memory 820B: 6 units of bandwidth
      1. Memory 820B has a bandwidth of 20 GB/s. 10 GB/s is equivalent to 1 unit of bandwidth.
      2. 2 units of bandwidth per processor core
   iv. (maximum interconnect link bandwidth)/(total max used bandwidth)="average bandwidth budget per device"
      1. 2 units of bandwidth capacity for Interconnect link 815E/(1 unit of bandwidths for PCIe 860A+6 units of bandwidth for Memory 820B)
      2. 2/(1+6)*100≈28 units of bandwidth
d. Group 910D to Group 910A:
   i. Interconnect link 815B: 2 units of bandwidth capacity
   ii. NVMe drives 850M-T: 4 units of bandwidth
      1. One NVMe drive with a bandwidth capacity of 3.2 GB/s. 6 GB/s bandwidth is equivalent to 1 unit of bandwidth.
   iii. Memory 820B: 6 units of bandwidth
      1. Memory 820B has a bandwidth of 20 GB/s. 10 GB/s is equivalent to 1 unit of bandwidth.
      2. 2 units of bandwidth per processor core
   iv. (maximum interconnect link bandwidth)/(total max used bandwidth)="average bandwidth budget per device"
      1. 2 units of bandwidth capacity for Interconnect link 815B/(4 units of bandwidths for NVMe drives 850M-T+6 units of bandwidth for Memory 820B)
      2. 2/(4+6)*100≈20 units of bandwidth
e. Group 910E to Group 910A:
   i. Interconnect link 815D: 2 units of bandwidth capacity
   ii. Memory 820B: 6 units of bandwidth
      1. Memory 820B has a bandwidth of 20 GB/s. 10 GB/s is equivalent to 1 unit of bandwidth.
      2. 2 units of bandwidth per processor core
   iii. PCIe 860B: 1 unit of bandwidth
      1. 16 PCIe lanes with 16 GB/s. 16 GB/s is equivalent to 1 unit of bandwidth.
   iv. (maximum interconnect link bandwidth)/(total max used bandwidth)="average bandwidth budget per device"
      1. 2 units of bandwidth capacity for Interconnect link 815D/(6 units of bandwidth for Memory 820B+1 unit of bandwidth for PCIe 860B)
      2. 2/(6+1)*100≈28 units of bandwidth
f. Group 910F to Group 910A:
   i. Interconnect link 815F: 2 units of bandwidth capacity
   ii. NVMe drives 850U-X: 2 units of bandwidth
      1. One NVMe drive with a bandwidth capacity of 3.2 GB/s. 6 GB/s bandwidth is equivalent to 1 unit of bandwidth.

iii. Memory 820B: 4 units of bandwidth
   1. One memory has a bandwidth of 20 GB/s. 10 GB/s is equivalent to 1 unit of bandwidth.
   2. 2 units of bandwidth per processor core
iv. PCIe 860C: 1 unit of bandwidth
   1. 16 PCIe lanes with 16 GB/s. 16 GB/s is equivalent to 1 unit of bandwidth.
v. (maximum interconnect link bandwidth)/(total max used bandwidth)="average bandwidth budget per device"
   1. 2 units of bandwidth capacity for Interconnect link 815F/(2 units of bandwidth for NVMe drives 850U-X+4 units of bandwidth for Memory 820B+1 unit of bandwidth for PCIe 860C)
   2. 2/(2+4+1)*100≈28 units of bandwidth Processor speeds have increased dramatically, outstripping memory-access speeds. The processors may now wait for storage units to complete memory-access requests before completing their tasks. To reduce delays resulting from memory-access wait times, multi-processor information handling systems may incorporate a NUMA architecture in which the memory access time for different processor depends on the memory location. Each processor is closer to some memory location, such as local memory, and father from other memory locations, such as memory local to a different processor or shared between processors. Under the NUMA architecture, a processor in the information handling system can access its local memory quicker than it can access a non-local memory.

A NUMA platform may a multi-processor system where the processing elements share a single global memory that is physically distributed into several memory banks. These memory banks are interconnected by a specialized network. Due to this interconnection, memory access costs may vary depending on the distance between processing elements accessing the same memory bank.

Figure 11:
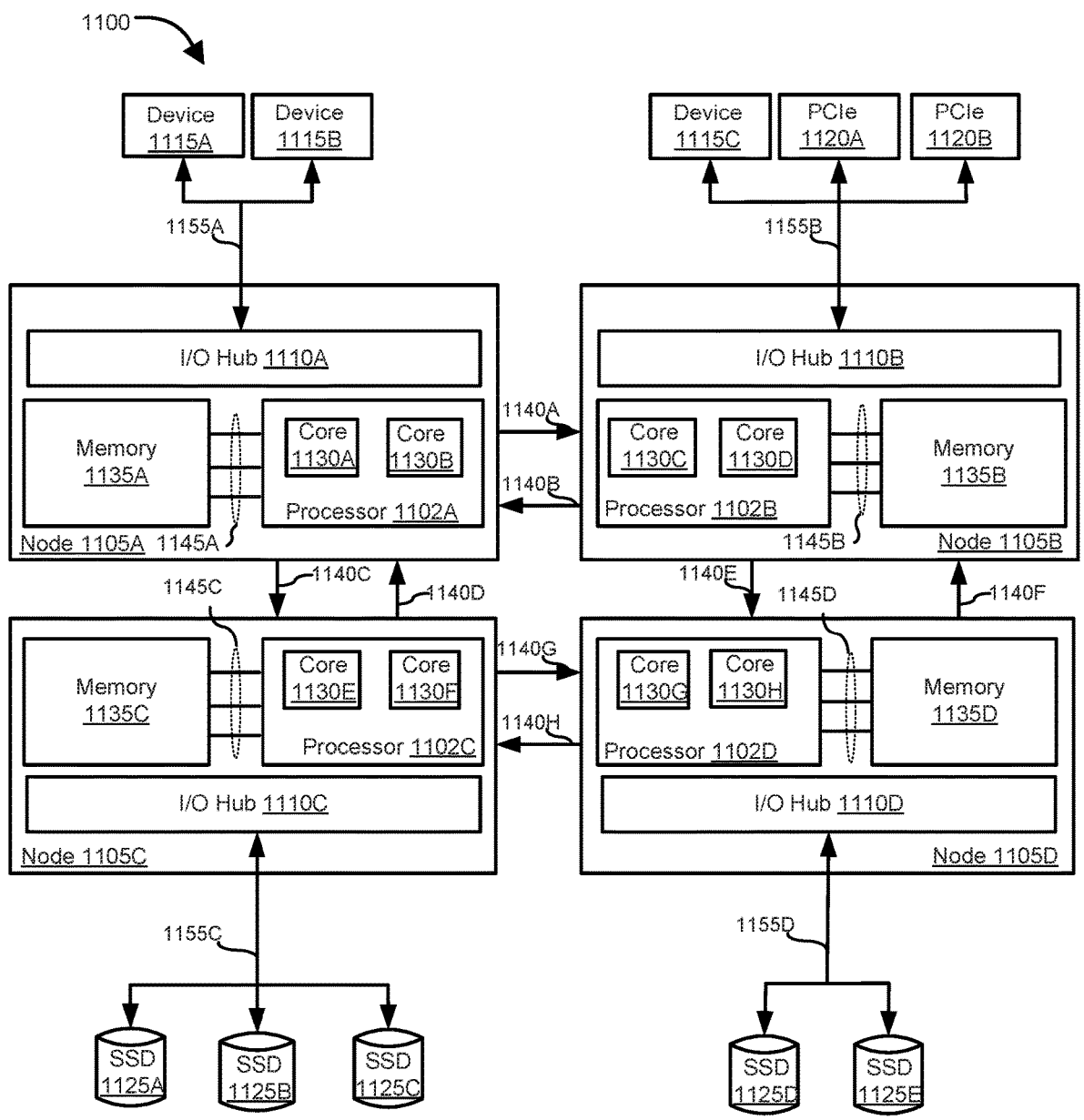
FIG. 11 shows a block diagram of a system topology of an information handling system according to at least one embodiment of the present disclosure.

FIG. 11 shows an information handling system 1100 similar to information handling system 100. Information handling system 1100 is an example of a multi-socket, asymmetric multi-processor system having multiple processor cores. Information handling system 1100 includes a set of nodes, a set of processors, a set of processor cores, a set of interconnect links, and a set of devices. Information handling system 1100 includes four nodes 1105A-D. Node 1105A includes a processor 1102A, a memory 1135A and an I/O hub 1110A. Node 1105B includes a processor 1102B, a memory 1135B and an I/O hub 1110B. Node 1105C includes a processor 1102C, a memory 1135C and an I/O hub 1110C. Node 1105D includes a processor 1102D, a memory 1135D and an I/O hub 1110D. Processor 1102A includes processor cores 1130A-B. Processor 1102B includes processor cores 1130C-D. Processor 1102C includes processor cores 1130E-F. Processor 1102D includes processor cores 1130G-H. Processor 1102A is coupled to memory 1135A via a memory channel 1145A. Processor 1102B is coupled to memory 1135B via a memory channel 1145B. Processor 1102C is coupled to memory 1135C via a memory channel 1145C. Processor 1102D is coupled with memory 1135D via memory channel 1145D.

Node 1105A is connected to node 1105B by interconnect links 1140A and 1140B. Node 1105B is connected to node 1105D by interconnect links 1140E-F. Node 1105A is connected to node 1105C by interconnect links 1140C-D. Node 1105C is connected to node 1105D by interconnect links 1140G-H. The nodes may be connected to the interconnect links via interconnect ports (not shown).

Devices 1115A-B are coupled to I/O hub 1110A via an I/O channel 1155A. A device 1115C and PCIes 1120A-B are coupled to I/O hub 1110B via an I/O channel 1155B. SSD drives 1125A-C are coupled to I/O hub 1110C via an I/O channel 1155C. SSD drives 1125D-E are coupled to I/O hub 1110D via an I/O channel 1155D.

Figures 12, 13:
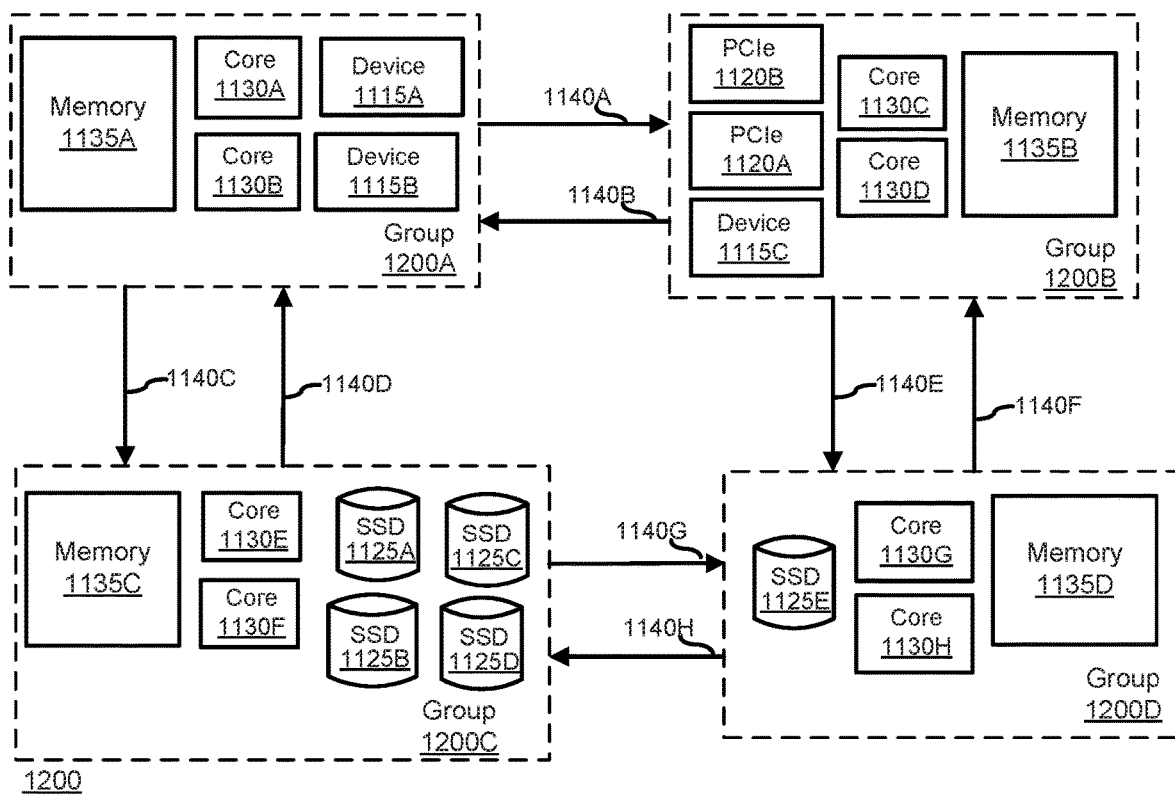
FIG. 12 is a block diagram of a system topology of an information handling system according to at least one embodiment of the present disclosure.
FIG. 13 is an IBT according to at least one embodiment of the present disclosure.

FIG. 12 shows a system topology 1200 that illustrates distribution of certain hardware components and resources into groups and associations with other groups. A group 1200A includes processor cores 1130A-B, devices 1115A-B, and memory 1135A. Group 1200B includes processor cores 1130C-D, device 1115C, PCIe 1120A-B, and memory 1135B. Group 1200A is connected to Group 1200B via an interconnect link 1140A. Group 1200B is connected to Group 1200A via an interconnect link 1140B. A group 1200C includes processor cores 1130E-F, SSDs 1125A-D, and memory 1135C. Group 1200D includes processor cores 1130G-H, SSD 1125E, and memory 1135D. Group 1200C is connected to Group 1200D via an interconnect link 1140G. Group 1200D is connected to Group 1200C via an interconnect link 1140H.

The SRAT stores topology information for processors and memory describing the location of the processors and memory in the system. The SRAT is used in memory allocation and scheduling application processes for maximum performance. In some topologies, the nodes are fully connected by interconnect links such as each node is directly connected to all the other nodes. Thus, any given node is connected to another node by one interconnect link or one "hop" away from every other node. In other topologies, the nodes are not fully connected. Consequently, some of the nodes may be more than one hop away from one node. To access a node that is not directly connected to another node, a request may be routed via another node. As the distance of the remote memory increases the average cost to access the remote memory increases. For example, it is more expensive to access a remote memory vs a local memory. Further, it is more expensive to access a remote memory that is two hops away vs a remote memory that is one hop away. So even if some system localities are "closer" but their available bandwidth is less, it might be more efficient to schedule a process with other system localities that may be "farther" but have the more available bandwidth. Also, if hop counts affect access speed more than changes in memory size, the algorithm may assign a larger weight to the hop counts than to the memory size.

The BIOS/EFI may use the SLIT to form a node distance table. The distances reflect the expected topology based on the architecture of a particular SKU of the information handling system. The SLIT provides a summation of a relative cost of access between a given pair of nodes. The BIOS/EFI may then use the SLIT to determine the costs of access and other activities. This information may then be used with the SRAT in scheduling processes.

Memory access latencies are measured for uncontended access to a remote memory. These memory access latencies may be affected by contention for access to interconnect links. As load to an interconnect link increases, the average cost to access the remote memory increases which may affect performance. Therefore, in addition to using the SRAT and the SLIT, there is a need to consider the relative cost of access between nodes based on the available maximum bandwidth of interconnect links between a given pair of nodes. An IBT may provide a summation of the relative cost to access between nodes based on the available maximum bandwidth of interconnect links between a given pair of nodes. The BIOS/EFI may then use the IBT with the SRAT and/or SLIT to determine the costs of access and other activities. This information may then be used in scheduling processes.

In addition, there may be runtime changes to the topology which may affect performance. For example, one of the interconnect links between two nodes may be reassigned to connect to a PCIe interface instead reducing the number of interconnect links between the nodes increasing the possibility of saturating the interconnect links which may create a bottleneck. The PCIe interface may also be coupled to PCIe devices such as NVMe drives, further increasing the possibility of the saturation. The BIOS/EFI may be configured to perform calculations of the maximum available bandwidth based on the changes to the topology and repopulate the IBT.

The IBT may be included with the BIOS/EFI as part of the SRAT and/or the SLIT. The IBT may be copied from BIOS/EFI code to the ACPI nonvolatile storage (NVS) portion of main memory during system configuration and initialization. The IBT may then be accessed by an operating system as needed in scheduling to maximize performance. For example, the operating system may use the IBT to direct a processor to transfer data between the I/O device and the memory resource in closest proximity, with the most available bandwidth, to that device.

FIG. 13 shows an IBT 1300 based on information handling system 1100 as shown in FIG. 11 and system topology 1200 of FIG. 12. Below are calculations of values used in IBT 1000:

a. Group 1200A to Group 1200B:
  i. Interconnect link 1140A: 2 units of bandwidth capacity
    1. Interconnect link 1140A with a bandwidth capacity of 21 GB/s. 10 GB/s is equivalent to 1 unit of bandwidth.
  ii. Devices 1115A-B: 2 units of bandwidth
  iii. Memory 1135A: 4 units of bandwidth
    1. 2 units of bandwidth per processor core
  iv. (maximum interconnect link bandwidth)/(total max used bandwidth)="average bandwidth budget per device"
    1. 2 units of bandwidth capacity for Interconnect link 1140A/(2 units of bandwidth for devices 1115A-B+4 units of bandwidth for memory 1135A)
    2. 2/(2+4)*100≈33 units of bandwidth b. Group 1200A to Group 1200C:
  i. Interconnect link 1140C: 2 units of bandwidth capacity
    1. Interconnect link 1140C with a bandwidth capacity of 21 GB/s. 10 GB/s is equivalent to 1 unit of bandwidth.
  ii. Device 1115A-B: 2 units of bandwidth
  iii. Memory 1135A: 4 units of bandwidth
    1. 2 units of bandwidth per processor core
  iv. (maximum interconnect link bandwidth)/(total max used bandwidth)="average bandwidth budget per device"
    1. 2 units of bandwidth capacity for Interconnect link 1140C/(2 units of bandwidth for devices 1115A-B+4 units of bandwidth for memory 1135A)
    2. 2/(2+4)*100≈33 units of bandwidth c. Group 1200A to Group 1200D:
  i. Interconnect link 1140C: 2 units of bandwidth capacity
    1. Interconnect link 1140C with a bandwidth capacity of 21 GB/s. 10 GB/s is equivalent to 1 unit of bandwidth.
  ii. Interconnect link 1140E: 2 units of bandwidth capacity
    1. Interconnect link 1140E with a bandwidth capacity of 21 GB/s. 10 GB/s is equivalent to 1 unit of bandwidth.
  iii. Device 1115A-B: 2 units of bandwidth
  iv. Memory 1135A: 4 units of bandwidth
    1. 2 units of bandwidth per processor core
  v. (maximum interconnect link bandwidth)/(total max used bandwidth)="average bandwidth budget per device"
    1. 2 units of bandwidth capacity for Interconnect link 1140C/(2 units of bandwidth for interconnect link 1140E+2 units of bandwidth for devices 1115A-B+4 units of bandwidth for memory 1135A)
    2. 2/(2+2+4)*100≈25 units of bandwidth d. Group 1200B to Group 1200A:
  i. Interconnect link 1140B: 2 units of bandwidth capacity
    1. Interconnect link 1140B with a bandwidth capacity of 21 GB/s. 10 GB/s is equivalent to 1 unit of bandwidth.
  ii. Device 1115C: 1 unit of bandwidth
  iii. PCIes 1120A-B: 4 units of bandwidth capacity
    1. 2 units of bandwidth per PCIe device
  iv. Memory 1135A: 4 units of bandwidth
    1. 2 units of bandwidth per processor core
  v. (maximum interconnect link bandwidth)/(total max used bandwidth)="average bandwidth budget per device"
    1. 2 units of bandwidth capacity for Interconnect link 1140B/(1 unit of bandwidth for device 1115C+4 units of bandwidth for PCIe 1120A-B+4 units of bandwidth for memory 1135A)
    2. 2/(1+4+4)*100≈22 units of bandwidth e. Group 1200B to Group 1200D:
  i. Interconnect link 1140E: 2 units of bandwidth capacity
    1. Interconnect link 1140*e* with a bandwidth capacity of 21 GB/s. 10 GB/s is equivalent to 1 unit of bandwidth.
  ii. Device 1115C: 1 unit of bandwidth
  iii. PCIes 1120A-B: 4 units of bandwidth capacity
    1. 2 units of bandwidth per PCIe device
  iv. Memory 1135A: 4 units of bandwidth
    1. 2 units of bandwidth per processor core
  v. (maximum interconnect link bandwidth)/(total max used bandwidth)="average bandwidth budget per device"
    1. 2 units of bandwidth capacity for Interconnect link 1140E/(1 unit of bandwidth for device 1115C+4 units of bandwidth for PCIe 1120A-B+4 units of bandwidth for memory 1135A)
    2. 2/(1+4+4)*100≈22 units of bandwidth f. Group 1200B to Group 1200C:
  i. Interconnect link 1140E: 2 units of bandwidth capacity
    1. Interconnect link 1140*e* with a bandwidth capacity of 21 GB/s. 10 GB/s is equivalent to 1 unit of bandwidth.
  ii. Interconnect link 1140H: 2 units of bandwidth capacity
    1. Interconnect link 1140E with a bandwidth capacity of 21 GB/s. 10 GB/s is equivalent to 1 unit of bandwidth.
  iii. Device 1115C: 1 unit of bandwidth
  iv. PCIes 1120A-B: 4 units of bandwidth capacity 1. 2 units of bandwidth per PCIe device
  v. Memory 1135A: 4 units of bandwidth
    1. 2 units of bandwidth per processor core
  vi. (maximum interconnect link bandwidth)/(total max used bandwidth)="average bandwidth budget per device"
    1. 2 units of bandwidth capacity for Interconnect link 1140E/(2 units of bandwidth for interconnect link 1140H+1 unit of bandwidth for device 1115C+4 units of bandwidth for PCIes 1120A-B+4 units of bandwidth for memory 1135A)
    2. (2)/(2+1+4+4)*100≈18 units of bandwidth
g. Group 1200C to Group 1200A:
  i. Interconnect link 1140D: 2 units of bandwidth capacity
    1. Interconnect link 1140D with bandwidth capacity of 21 GB/s. 10 GB/s is equivalent to 1 unit of bandwidth.
  ii. SSDs 1120A-D: 4 units of bandwidth capacity
    1. 1 unit of bandwidth per SSD
  iii. Memory 1135C: 4 units of bandwidth
    1. 2 units of bandwidth per processor core
  iv. (maximum interconnect link bandwidth)/(total max used bandwidth)="average bandwidth budget per device"
    1. 2 units of bandwidth capacity for Interconnect link 1140D/(4 units of bandwidth for SSDs 1120A-D+4 units of bandwidth for memory 1135C)
    2. 2/(4+4)*100≈25 units of bandwidth
h. Group 1200D to Group 1200C:
  i. Interconnect link 1140H: 2 units of bandwidth capacity
    1. Interconnect link 1140H with a bandwidth capacity of 21 GB/s. 10 GB/s is equivalent to 1 unit of bandwidth.
  ii. SSD 1120E: 1 unit of bandwidth capacity
    1. 1 unit of bandwidth per SSD
  iii. Memory 1135D: 4 units of bandwidth
    1. 2 units of bandwidth per processor core
  iv. (maximum interconnect link bandwidth)/(total max used bandwidth)="average bandwidth budget per device"
    1. 2 units of bandwidth capacity for Interconnect link 1140D/(1 units of bandwidth for SSD 1120E+4 units of bandwidth for memory 1135D)
    2. 2/(1+4)*100≈40 units of bandwidth
i. Group 1200D to Group 1200B:
  i. Interconnect link 1140F: 2 units of bandwidth capacity
    1. Interconnect link 1140F with a bandwidth capacity of 21 GB/s. 10 GB/s is equivalent to 1 unit of bandwidth.
  ii. SSD 1120E: 1 unit of bandwidth capacity
    1. 1 unit of bandwidth per SSD
  iii. Memory 1135D: 4 units of bandwidth
    1. 2 units of bandwidth per processor core
  iv. (maximum interconnect link bandwidth)/(total max used bandwidth)="average bandwidth budget per device"
    1. 2 units of bandwidth capacity for Interconnect link 1140F/(1 units of bandwidth for SSD 1120E+4 units of bandwidth for memory 1135D)
    2. 2/(1+4)*100≈40 units of bandwidth
j. Group 1200D to Group 1200A:
  i. Interconnect link 1140F: 2 units of bandwidth capacity
    1. Interconnect link 1140F with a bandwidth capacity of 21 GB/s. 10 GB/s is equivalent to 1 unit of bandwidth.
  ii. Interconnect link 1140D: 2 units of bandwidth capacity
    1. Interconnect link 1140D with a bandwidth capacity of 21 GB/s. 10 GB/s is equivalent to 1 unit of bandwidth.
  iii. SSD 1120E: 1 unit of bandwidth capacity
    1. 1 unit of bandwidth per SSD
  iv. Memory 1135D: 4 units of bandwidth
    1. 2 units of bandwidth per processor core
  v. (maximum interconnect link bandwidth)/(total max used bandwidth)="average bandwidth budget per device"
    1. 2 units of bandwidth capacity for Interconnect link 1140F/(2 units of bandwidth for interconnect link 1140D+1 unit of bandwidth for SSD 1120E+4 units of bandwidth for memory 1135D)
    2. 2/(2+1+4)*100≈28 units of bandwidth The calculation used in determining the interconnect link values used in populating IBT 1300 did not account for hop counts. In another embodiment, the algorithm may take into account the impact of hop count to memory access speeds in the system. For example, the node with higher hop count may be assigned a greater weight than a node with a lower hop count. Depending on the weight assigned to the hop count and the memory unit, the interconnect link values may change. The various algorithms depicted in the current disclosure are but examples of the many possible algorithms and should not be construed as a limitation on the possible algorithms. For example, the algorithm could incorporate other factors beyond interconnect link bandwidth, memory size, hop count, device bandwidth, if desired.

It will be appreciated that although for purposes of illustration the information handling system is shown to have two sockets, in other embodiments the information handling system may have up to N sockets, where N is an integer. Also, it will be appreciated that although each socket is shown to hold one processor, in other embodiments a socket may hold up to N processors, where N is an integer. Each processor may have one or more processor cores. Each of the processor cores can be configured to execute a set of instructions. It will be appreciated that although for purposes of illustration each of the processors has two or four processor cores, in other embodiments each of the processors and can have up to N cores, where N is an integer. In addition, it will be appreciated that although the processors are illustrated as separate physical processors, in an embodiment one or more of the processors can be a logical processor such as a hyperthreaded logical processor.

Figure 14:
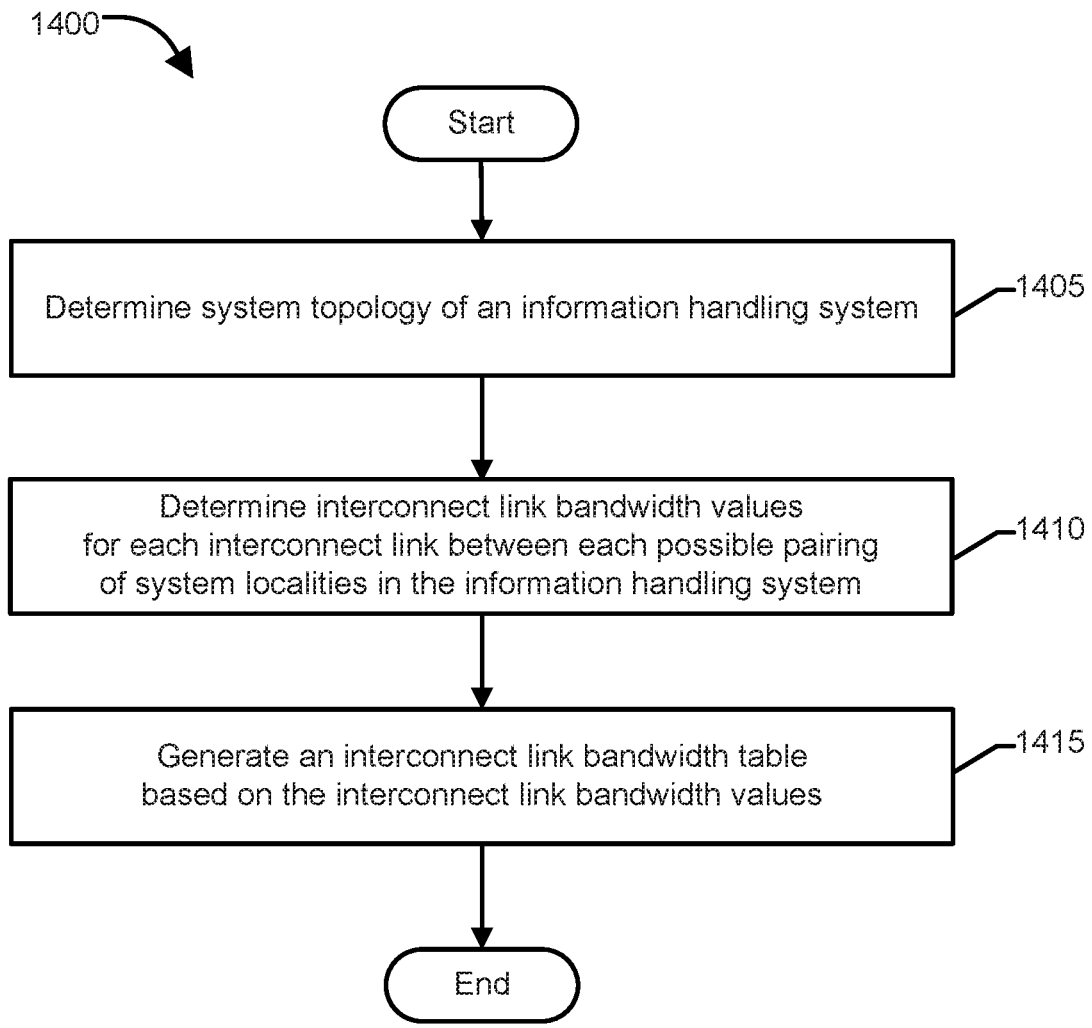
FIG. 14 is a flowchart of a method of performing an asymmetric system description according to at least one embodiment of the present disclosure.

FIG. 14 is a flow diagram that shows a method 1400 of asymmetric system description for optimized scheduling. An information handling system may include multiple sockets, processors and processor cores. The processor cores may be divided into groups that share memory and/or resources. The multi-core design allows computer architecture engineers to build powerful shared memory machines with tens or even hundreds of cores. However, the increasing number of cores demands an efficient memory hierarchy solution, since several cores might use the same interconnect link to access the shared memory. Thus, achieving optimum performance on multi-core information handling systems has been a challenge due to the access times associated with traversing interconnect links for a processor core in one group to access a memory or device with another group.

A key piece of information a scheduler uses in determining schedules is how processors share resources. If there is substantial resource sharing between the processors, there needs to be understanding of how the performance of the processor is impacted as additional processors share the same resources. This piece of information is included in what is referred to herein as system topology. The system topology can also include information regarding how the various elements of the information handling device such as processors, processor cores, memory, etc. communicate for example via interconnect links. In addition, the system topology may include additional information such as device identifiers, addresses, allocated memory locations or buffers storing event messages or event logs, or any combination thereof.

At block 1405, BIOS/EFI determines the architecture and topology of the information handling system. The BIOS/EFI may gather information regarding the various elements of the architecture and topology of the information handling system. For example, the BIOS/EFI may identify the processor (such as identify the processor identifier, SKU, etc.), the number of processors and sockets in the information handling system. In addition, the BIOS/EFI may determine the relationships of the processors, processor cores, logical processors, memory, devices, interconnect links, resources, interfaces, etc.

At block 1410, the BIOS/EFI determines the interconnect link bandwidth values for each of interconnect links between each possible pairing of system localities in the information handling system. To calculate interconnect link bandwidth values, a value may be assigned to each of the elements included in a system locality. A system locality may be identified at a sub-NUMA node level. For example, the information handling system may be divided into sub-NUMA domains corresponding to core dies. If one system locality is not connected to another system locality via an interconnect link, a predetermined value may be stored instead.

The BIOS/EFI may first determine the bandwidth of the system components (such as the processor, the processor core, etc.), interconnect links, memory, resources, devices, interfaces, etc. in each of the system localities. Further, the BIOS/EFI may use weights and/or approximations in calculating the value assigned to each element. An algorithm is then used to calculate the interconnect link bandwidth values based on the determined values assigned to each element. The algorithm used may be determined prior to the calculation. The interconnect link bandwidth values or units of bandwidth may be normalized and relative to a reference value.

At block 1415, the BIOS/EFI may generate data structures such as an IBT based on the interconnect link values in accordance with the architecture and the system topology of the information handling system. The format of the IBT may include a header, number of system localities, and entry values. The header may include attributes such as a unique identifier of the table, the size of the IBT, and revision. The IBT may be similar to the SLIT. The entry values may be an integer, whole number, fixed point, floating point, etc.

The BIOS/EFI may pass the data structures to the operating system in accordance with the ACPI specification. The ACPI specification provides a number of data structures that enable the BIOS/EFI to describe the system topology to the operating system. The description of the system topology may include a definition of NUMA nodes, system localities, and its association. The associations may be depicted using the SLIT and SRAT. The operating system uses this information in various functions such as in the definition of control groups, NUMA and scheduling optimizations.

The operating system and/or a scheduler may use the IBT to optimize scheduling, storage, and other management tasks. For example, the scheduler may favor system localities that have higher bandwidth availability as shown in the IBT. In another example, the scheduler may refrain from system localities that have lower bandwidth availability such as interconnect links that are oversubscribed. The IBT may be included in the ACPI specification in addition to the other data structures. The operating system and/or scheduler may then use a pointer to the ACPI tables to access the IBT. Using the IBT, the operating system and/or scheduler can identify over-subscribed and under-subscribed interconnect links. This information may then be used in generating or optimizing a process schedule for example.

Although FIG. 14 describes a system and method that assumes the hardware components of the information handling system remain static, the system and method could provide a mechanism to assess whether any of the hardware components have changed. For example, if a memory unit, a processor core and/or interconnect link associated with a node is changed (added and/or removed), the system could detect the change and recalculate the interconnect link values and repopulate the IBT accordingly as shown in FIG. 15.

Figure 15:
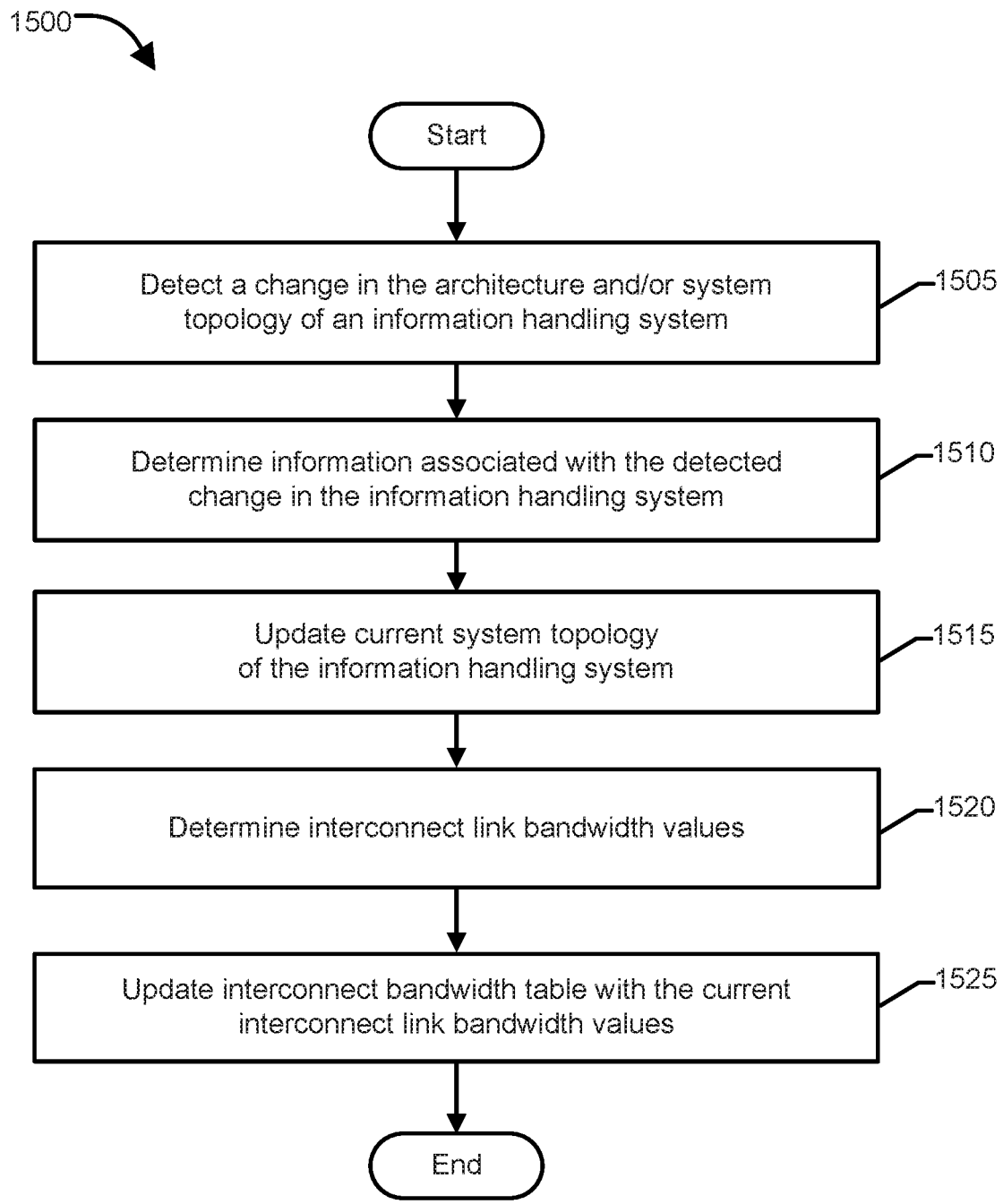
FIG. 15 is a flowchart of a method of performing an asymmetric system description according to at least one embodiment of the present disclosure.

FIG. 15 illustrates a method 1500 of asymmetric system description for optimized scheduling. Current architectures of information handling systems are allowing an increasing number of processor, processor cores, memory, I/O devices, interfaces, interconnect links and various other resources to be included. In addition, the architecture also allows flexible usage of the interconnect links. For example, an interconnect link that currently connects a processor core to another processor core may be repurposed to connect to a PCIe interface to allow PCIe devices to be attached to the information handling system. Repurposing an interconnect link reduces the number of interconnect links used by processor cores to access other processor cores and memory creating an imbalance of resources competing for the remaining interconnect links saturating the remaining interconnect links.

At block 1505, the operating system detects a change in the system topology of the information handling system. The change in the system topology may be detected during initialization or at runtime. During runtime, the change may be detected via a system level interrupt signal. The operating system may identify the change associated with the detected system level interrupt signal. The change may include a change in the architecture and/or system topology of the information handling system. For example, the operating system or a controller may determine a change such as addition or removal of a system component and/or resource such as a processor, processor core, memory, interconnect link, physical switch port, PCIe interface, I/O device, storage device, etc.

At block 1510, the operating system determines information associated with the detected change with the information handling system. For example, the operating system may determine attributes such as an identifier, addresses, bandwidth, allocated memory locations, or buffers, etc. or any combination thereof of the system component and/or resource.

At block 1515, the operating system updates the current system topology of the information handling system. The operating may then store the updated system topology. At block 1520, the operating system determines the interconnect link values based on the updated system topology. Similar to block 1410, the interconnect link values may be calculated based on the SKU of the processor that populates the sockets. The characteristics used in calculating the interconnect link bandwidth values that populate the IBT could include the bandwidth of the interconnect links and other factors or attributes such as the number and bandwidth of resources that share the interconnect link. The algorithm may use more or fewer factors depending on the system topology.

At block 1525, the operating system updates the IBT with the current interconnect bandwidth values. The rows and columns of the IBT are proximity object. The table entries are worst-case bandwidth numbers which allow the operating system to place priority on different system components and/or resources. The algorithm used in calculating the table entries may vary from one IBT to another or from one information handling system to another, or any combination thereof. In one embodiment, the table entries reflect the available bandwidth on the interconnect link divided by the total weighted number associated with devices that share that interconnect link. Comparing the actual load to the upper bound reveals which inter-connect links are under stress and hence likely to be bottlenecks.

Sockets, as used in the current disclosure, provide a physical and an electrical connection between a component and a PCB. Sockets may include various packaging technologies used as physical interface for the component such as ball grid arrays (BGAs), pin grid arrays (PGAs), land grid arrays (LGAs), or the like. In other embodiments, the packaging technologies may include multiple die (dice) packaging and multi-chip packaging (MCP).

The above example illustrations presume one or more physical processors that are mounted on separate sockets. In other embodiments, other components may also be mounted on the sockets in addition to or in lieu of the processors. These components may also be configured to use the inter-socket links similar to the examples depicted. These components include accelerators, off-load engines, I/O controllers, DMA controllers, GPUs, FPGAs, or anything else that can generate or receive traffic over the inter-socket links.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. An asymmetric information handling system comprising:
    a system board having a plurality of sockets;
    a plurality of processors, each processor disposed in a respective socket;
    a plurality of interconnect links configured to provide point-to-point links between at least some of the sockets; and
    a plurality of memories corresponding to the processors; wherein one of the processors is operable to:
        determine an arrangement of the processors, the memories, and the interconnect links wherein the arrangement includes a plurality of system localities, and wherein each system locality includes one of the processors and one of the memories;
        determine a first value for the each of the processors, a second value for each of the memories, and a third value for each of the interconnect links, wherein the first value of the each processor is based on a weighted processor bandwidth capacity of the each processor, wherein the second value of the each memory is based on a weighted memory bandwidth capacity of the each memory, and wherein the third value of the each interconnect link is based on a weighted interconnect link bandwidth capacity of the each interconnect link;
        calculate interconnect link bandwidth values for the each of the interconnect links based at least in part on the first value of the each processor, the second value of the each memory, and the third value of the each interconnect link; and
        populate an interconnect bandwidth table using the interconnect link bandwidth values, wherein an operating system executing on the asymmetric information handling system prioritize resources of the asymmetric information handling system by selecting an interconnect link having maximum available bandwidth from the interconnect bandwidth table, and wherein the operating system allocates processes among a subset of the system localities in the asymmetric information handling system based on the prioritization.

2. The asymmetric information handling system of claim 1, wherein the each of the processors has a local memory that is accessible to all of the processors.

3. The asymmetric information handling system of claim 1, wherein the interconnect link bandwidth values are further based on an architecture of the asymmetric information handling system.

4. The asymmetric information handling system of claim 1, wherein the arrangement of the processors, the memories and the interconnect links includes a division of the processors and the memories into groups, wherein each group includes one processor and one memory.

5. The asymmetric information handling system of claim 4, wherein the one processor is further operable to determine all possible pairings between each of the groups.

6. The asymmetric information handling system of claim 4, wherein each of the groups further includes at least one of a data drive and a peripheral component interconnect express.

7. A method to augment a scheduler of an asymmetric information handling system, the method comprising:
 determining an arrangement of a plurality of processors, a plurality of memories and a plurality of interconnect links, wherein the arrangement includes a plurality of system localities, and wherein each system locality includes one of the processors and one of the memories;
 determining a first value for each processor of the processors, a second value for each memory of the memories, and a third value for each interconnect link of the interconnect links, wherein the first value of the each processor is based on a weighted processor bandwidth capacity of the processor, wherein the second value of the each memory is based on a weighted memory bandwidth capacity of the each memory, and wherein the third value of the interconnect link is based on a weighted interconnect link bandwidth capacity of the each interconnect link;
 calculating an interconnect link bandwidth value for each of the interconnect links providing point-to-point links between at least some of the system localities, based at least in part on the first value of the each processor, the second value of the each memory, and the third value of the each interconnect link; and
 populating a hardware memory with an interconnect bandwidth table using the interconnect link bandwidth values, wherein an operating system executing on the asymmetric information handling system prioritizes resources of the asymmetric information handling system, by selecting an interconnect link having maximum available bandwidth from the interconnect bandwidth table and wherein the operating system processes among a subset of the system localities in the asymmetric information handling system based on the prioritization.

8. The method of claim 7, wherein one of the interconnect link bandwidth values is an average interconnect link bandwidth allocation per device.

9. The method of claim 7, wherein calculating the interconnect bandwidth value includes summing of the first value of the each processor and the second value of the each memory for each system locality.

10. A method for optimizing an asymmetric information handling system, the method comprising:
 determining system localities in the asymmetric information handling system, wherein at least one of the system localities includes a processor and a memory;
 calculating a first value of the processor and a second value of the memory for each of the system localities, wherein the first value of each processor is based on a weighted processor bandwidth capacity of the each processor and wherein the second value of each memory is based on a weighted memory bandwidth capacity of the memory;
 determining possible pairings of the system localities;
 calculating a bandwidth value for each of a plurality of interconnect links providing point to point link between each of the possible pairings based on the first value of each processor and the second value of each memory; and
 populating an interconnect bandwidth table stored in a hardware memory using the calculated bandwidth values, wherein an operating system executing on the asymmetric information handling system prioritizes resources of the asymmetric information handling system by selecting an interconnect link having maximum available bandwidth from the interconnect bandwidth table, and wherein the operating system allocates processes among a subset of the system localities in the asymmetric information handling system based on the prioritization.

11. The method of claim 10, wherein each of the bandwidth values is an interconnect link bandwidth allocation per device.

12. The method of claim 10, wherein each of the bandwidth values is a maximum spare bandwidth capacity of each interconnect link.

13. The method of claim 10, further comprising consulting the interconnect bandwidth table to prioritize which memory to use for a requesting processor.

14. The method of claim 10, further comprising consulting the interconnect bandwidth table to prioritize a data drive to use for a requesting processor.

15. The method of claim 10, wherein each of the system localities includes one processor and one memory.

16. The method of claim 10, further comprising:
 determining that an arrangement of the asymmetric information handling system has been altered;
 recalculating interconnect link bandwidth values for each interconnect link for each of the possible pairings; and
 repopulating the interconnect bandwidth table.

17. The method of claim 16, wherein the repopulated interconnect bandwidth table is used in reprioritizing memory distribution among processes during scheduling.

* * * * *

UNITED STATES PATENT AND TRADEMARK OFFICE
CERTIFICATE OF CORRECTION

PATENT NO. : 10,990,562 B2  
APPLICATION NO. : 16/245838  
DATED : April 27, 2021  
INVENTOR(S) : Andrew Butcher et al.

Page 1 of 1

It is certified that error appears in the above-identified patent and that said Letters Patent is hereby corrected as shown below:

In the Claims

Column 27, Lines 58-59: Please change "operating system processes among" to --operating system allocates processes among--

Signed and Sealed this  
Eighth Day of June, 2021

Drew Hirshfeld  
*Performing the Functions and Duties of the*  
*Under Secretary of Commerce for Intellectual Property and*  
*Director of the United States Patent and Trademark Office*